United States Patent
English et al.

(10) Patent No.: US 10,635,761 B2
(45) Date of Patent: Apr. 28, 2020

(54) SYSTEM AND METHOD FOR EVALUATION OF OBJECT AUTONOMY

(71) Applicant: ENERGID TECHNOLOGIES CORPORATION, Cambridge, MA (US)

(72) Inventors: James D. English, Alva, FL (US); Ryan S. Penning, Madison, WI (US); Douglas E. Barker, Somerville, MA (US); James A. Bacon, Bourbonnais, IL (US)

(73) Assignee: Energid Technologies Corporation, Cambridge, MA (US)

( * ) Notice: Subject to any disclaimer, the term of this patent is extended or adjusted under 35 U.S.C. 154(b) by 278 days.

(21) Appl. No.: 15/142,157

(22) Filed: Apr. 29, 2016

(65) Prior Publication Data

US 2016/0321381 A1 Nov. 3, 2016

Related U.S. Application Data

(60) Provisional application No. 62/179,134, filed on Apr. 29, 2015.

(51) Int. Cl.
*G06F 17/50* (2006.01)

(52) U.S. Cl.
CPC ............ *G06F 17/5009* (2013.01); *G05B 2219/23446* (2013.01); *G05D 2201/0213* (2013.01); *G06F 17/5095* (2013.01); *G06F 2217/10* (2013.01); *G06F 2217/16* (2013.01)

(58) Field of Classification Search
CPC .................................................. G06F 17/50
USPC .................................................... 703/1
See application file for complete search history.

(56) References Cited

U.S. PATENT DOCUMENTS

| | | | | |
|---|---|---|---|---|
| 2003/0093468 A1* | 5/2003 | Gordon | ............... | H04L 29/06 709/203 |
| 2005/0223191 A1* | 10/2005 | Ferris | ............... | G06F 9/45537 712/28 |
| 2006/0271245 A1* | 11/2006 | Herman | ............... | F41G 7/007 701/1 |
| 2009/0012923 A1* | 1/2009 | Moses | ............... | G06Q 10/10 706/46 |
| 2009/0222297 A1* | 9/2009 | Cao | ............... | G06Q 10/0635 705/400 |
| 2011/0308792 A1* | 12/2011 | Le Ravalec | ............... | G01V 11/00 166/250.01 |

(Continued)

OTHER PUBLICATIONS

Byungkyu, Evaluation of Stochastic Optimization Methods of Traffic Signal Control Settings for Coordinated Actuated Signal Systems. (Year: 2005).*

*Primary Examiner* — Lechi Truong
(74) *Attorney, Agent, or Firm* — Mark H. Whittenberger; Heath M. Sargeant; Holland & Knight LLP

(57) ABSTRACT

A method, computer program product, and computer system for configuring a stochastic simulation scenario, wherein the stochastic simulation scenario may include one or more variables without a complete probability distribution. The stochastic simulation scenario may be executed to generate one or more results of the stochastic simulation scenario. At least a portion of the one or more variables without the probability distribution may be optimized using one or more optimization metrics on the one or more results of the stochastic simulation scenario.

22 Claims, 40 Drawing Sheets

(56) References Cited

U.S. PATENT DOCUMENTS

| | | | | |
|---|---|---|---|---|
| 2012/0191427 A1* | 7/2012 | Cianflone | ........... | F02D 41/0007 |
| | | | | 703/2 |
| 2012/0290274 A1* | 11/2012 | Seningen | ............ | G06F 17/5036 |
| | | | | 703/2 |
| 2013/0124164 A1* | 5/2013 | Jha | .......................... | G06F 17/50 |
| | | | | 703/2 |
| 2017/0010538 A1* | 1/2017 | Hansen | ................... | G03F 7/705 |

* cited by examiner

Replacement Drawing

1800

3400

SYSTEM AND METHOD FOR EVALUATION OF OBJECT AUTONOMY

RELATED CASE

This application claims the benefit of U.S. Provisional Application No. 62/179,134 filed on 29 Apr. 2015, the contents of which are all incorporated by reference.

GOVERNMENT LICENSE RIGHTS TO CONTRACTOR-OWNED INVENTIONS MADE UNDER FEDERALLY SPONSORED RESEARCH AND DEVELOPMENT

This invention was made with Government support under contract number W56HZV-14-C-0199 awarded by the U.S. Army Contracting Command, contract number W56HZV-15-C-0171 awarded by the U.S. Army Contracting Command, contract number NNX13CA25P awarded by the National Aeronautics and Space Administration, and contract number NNX15CA40P awarded by the National Aeronautics and Space Administration. The Government has certain rights in this invention.

BACKGROUND

Objects (e.g., vehicles) may be directly used by people, as well as via automation. For instance, self-driving cars may be available that may not rely upon user control. To ensure the self-driving car operates/navigates safely, it may be necessary to verify that the proper sensing and control algorithms are used. Traditional simulations may not adequately provide such verification.

BRIEF SUMMARY OF DISCLOSURE

In one example implementation, a method, performed by one or more computing devices, may include but is not limited to configuring, by a computing device, a stochastic simulation scenario, wherein the stochastic simulation scenario may include one or more variables without a complete probability distribution. The stochastic simulation scenario may be executed to generate one or more results of the stochastic simulation scenario. At least a portion of the one or more variables without the probability distribution may be optimized using one or more optimization metrics on the one or more results of the stochastic simulation scenario.

One or more of the following example features may be included. The stochastic simulation scenario may be randomized and digital. The stochastic simulation scenario may include hardware-in-the-loop architecture associated with the stochastic simulation scenario. The stochastic simulation scenario may include at least one of: a land vehicle, an air vehicle, and a water vehicle, one or more fixed base articulated robot arms and one or more mobile articulated robot arms mounted on at least one of the land vehicle, the air vehicle, and the water vehicle. The stochastic simulation scenario may include an autonomous convoy. The one or more optimization metrics may include a threshold measure of variance. The stochastic simulation scenario may use Monte Carlo analysis. The stochastic simulation scenario may include at least one of an orbit, an asteroid, a comet, a planet, and a moon.

In another example implementation, a computing system may include one or more processors and one or more memories configured to perform operations that may include but are not limited to configuring a stochastic simulation scenario, wherein the stochastic simulation scenario may include one or more variables without a complete probability distribution. The stochastic simulation scenario may be executed to generate one or more results of the stochastic simulation scenario. At least a portion of the one or more variables without the probability distribution may be optimized using one or more optimization metrics on the one or more results of the stochastic simulation scenario.

One or more of the following example features may be included. The stochastic simulation scenario may be randomized and digital. The stochastic simulation scenario may include hardware-in-the-loop architecture associated with the stochastic simulation scenario. The stochastic simulation scenario may include at least one of: a land vehicle, an air vehicle, and a water vehicle, one or more fixed base articulated robot arms and one or more mobile articulated robot arms mounted on at least one of the land vehicle, the air vehicle, and the water vehicle. The stochastic simulation scenario may include an autonomous convoy. The one or more optimization metrics may include a threshold measure of variance. The stochastic simulation scenario may use Monte Carlo analysis. The stochastic simulation scenario may include at least one of an orbit, an asteroid, a comet, a planet, and a moon.

In another example implementation, a computer program product may reside on a computer readable storage medium having a plurality of instructions stored thereon which, when executed across one or more processors, may cause at least a portion of the one or more processors to perform operations that may include but are not limited to configuring a stochastic simulation scenario, wherein the stochastic simulation scenario may include one or more variables without a complete probability distribution. The stochastic simulation scenario may be executed to generate one or more results of the stochastic simulation scenario. At least a portion of the one or more variables without the probability distribution may be optimized using one or more optimization metrics on the one or more results of the stochastic simulation scenario.

One or more of the following example features may be included. The stochastic simulation scenario may be randomized and digital. The stochastic simulation scenario may include hardware-in-the-loop architecture associated with the stochastic simulation scenario. The stochastic simulation scenario may include at least one of: a land vehicle, an air vehicle, and a water vehicle, one or more fixed base articulated robot arms and one or more mobile articulated robot arms mounted on at least one of the land vehicle, the air vehicle, and the water vehicle. The stochastic simulation scenario may include an autonomous convoy. The one or more optimization metrics may include a threshold measure of variance. The stochastic simulation scenario may use Monte Carlo analysis. The stochastic simulation scenario may include at least one of an orbit, an asteroid, a comet, a planet, and a moon.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
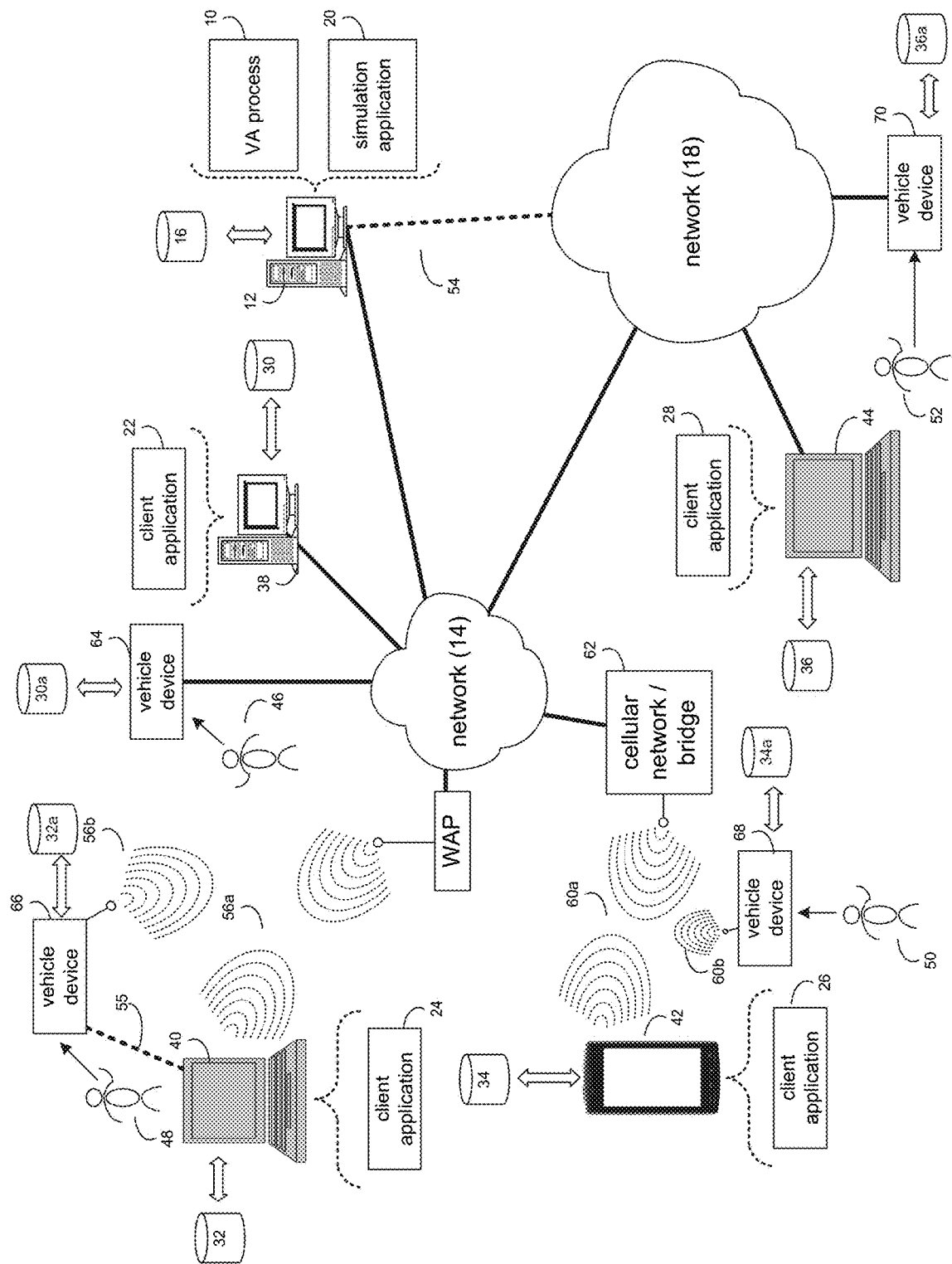
FIG. 1 is an example diagrammatic view of a VA process coupled to an example distributed computing network according to one or more example implementations of the disclosure.

System Overview:

In some implementations, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown VA process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both). Other operating systems may be used without departing from the scope of the disclosure.

In some implementations, as will be discussed below in greater detail, a VA process, such as VA process 10 of FIG. 1, may configure a stochastic simulation scenario, wherein the stochastic simulation scenario may include one or more variables without a complete probability distribution. The stochastic simulation scenario may be executed to generate one or more results of the stochastic simulation scenario. At least a portion of the one or more variables without the probability distribution may be optimized using one or more optimization metrics on the one or more results of the stochastic simulation scenario.

In some implementations, the instruction sets and subroutines of VA process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, VA process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a simulation application (e.g., simulation application 20), examples of which may include, but are not limited to, e.g., a stochastic simulation application, or other application that allows for evaluation of object autonomy. In some implementations, VA process 10 and/or simulation application 20 may be accessed via client applications 22, 24, 26, 28. In some implementations, VA process 10 may be a standalone application, or may be an applet/application/script/extension that may interact with and/or be executed within simulation application 20, a component of simulation application 20, and/or one or more of client applications 22, 24, 26, 28. In some implementations, simulation application 20 may be a standalone application, or may be an applet/application/script/extension that may interact with and/or be executed within VA process 10, a component of VA process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of VA process 10 and/or simulation application 20. Examples of client applications 22, 24, 26, 28 may include, but are not limited to, e.g., a stochastic simulation application, or other application that allows for evaluation of object autonomy, a vehicle device application, a standard and/or mobile web browser, an email application (e.g., an email client application), a textual and/or a graphical user interface, a customized web browser, a plugin, an Application Programming Interface (API), or a custom application. In some implementations, example client applications may include, e.g., SolidWorks, Mathematica, Matlab, Actin toolkit from Energid Technologies of Cambridge, Mass., etc. The instruction sets and subroutines of client applications 22, 24, 26, 28, which may be stored on storage devices 30, 32, 34, 36, 30a, 32a, 34a, 36a, coupled to client electronic devices 38, 40, 42, 44 and/or vehicle devices 64, 66, 68, 70, may be executed by one or more processors and one or more memory architectures incorporated into client electronic devices 38, 40, 42, 44 and/or vehicle devices 64, 66, 68, 70.

In some implementations, examples of vehicle devices 64, 66, 68, 70 may include, but are not limited to, e.g., a geo-based land, air, and water vehicle (e.g., car, truck, boat, plane, quadcopters, drones, other maned or unmanned air vehicles, etc.), a space exploration vehicle (e.g., lunar roving vehicle, robotic roving vehicles, etc.), an orbiting vehicle (e.g., satellite, rocket, etc.) or any other object capable of autonomous movement via VA process 10. In some implementations, vehicle devices 64, 66, 68, 70 may be capable of autonomous movement in orbit, on an asteroid, comet, planet, or moon.

In some implementations, storage devices 30, 32, 34, 36, 30a, 32a, 34a, 36a, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Additionally/alternatively, client electronic devices 38, 40, 42, 44 may include a vehicle device (e.g., vehicle devices 64, 66, 68, 70). Client electronic devices 38, 40, 42, 44 may each execute an operating system, examples of which may include but are not limited to, Android™, Apple® iOS®, Mac® OS X®; Red Hat® Linux®, or a custom operating system. VA process 10 may interface over a variety of network protocols, such as TCP, UDP, or others.

In some implementations, one or more of client applications 22, 24, 26, 28 may be configured to effectuate some or all of the functionality of VA process 10 (and vice versa). Accordingly, in some implementations, VA process 10 may be a purely server-side application, a purely client-side application, or a hybrid server-side/client-side application that is cooperatively executed by one or more of client applications 22, 24, 26, 28 and/or VA process 10.

In some implementations, one or more of client applications 22, 24, 26, 28 may be configured to effectuate some or all of the functionality of simulation application 20 (and vice versa). Accordingly, in some implementations, simulation application 20 may be a purely server-side application, a purely client-side application, or a hybrid server-side/client-side application that is cooperatively executed by one or more of client applications 22, 24, 26, 28 and/or simulation application 20. As one or more of client applications 22, 24, 26, 28, VA process 10, and simulation application 20, taken singly or in any combination, may effectuate some or all of the same functionality, any description of effectuating such functionality via one or more of client applications 22, 24, 26, 28, VA process 10, simulation application 20, or combination thereof, and any described interaction(s) between one or more of client applications 22, 24, 26, 28, VA process 10, simulation application 20, or combination thereof to effectuate such functionality, should be taken as an example only and not to limit the scope of the disclosure.

In some implementations, users 46, 48, 50, 52 and/or vehicle devices 64, 66, 68, 70 may access computer 12 and VA process 10 (e.g., using one or more of client electronic devices 38, 40, 42, 44) directly through network 14 or through secondary network 18. Further, computer 12 may be connected to network 14 through secondary network 18, as illustrated with phantom link line 54. VA process 10 may include one or more user interfaces, such as browsers and textual or graphical user interfaces, through which users 46, 48, 50, 52 may access VA process 10 and/or vehicle devices 64, 66, 68, 70.

In some implementations, the various client electronic devices and/or vehicle devices 64, 66, 68, 70 may be directly or indirectly coupled to network 14 (or network 18). For example, personal computer 38 and vehicle device 64 are shown directly coupled to network 14 via a hardwired network connection. Further, notebook computer 44 and vehicle device 70 are shown directly coupled to network 18 via a hardwired network connection. Laptop computer 40 and vehicle device 66 are shown wirelessly coupled to network 14 via wireless communication channels 56a and 56b respectively established between laptop computer 40 and wireless access point (i.e., WAP) 58 and between vehicle device 66 and WAP 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56a between laptop computer 40 and WAP 58 and wireless communication channel 56b between vehicle device 66 and WAP 58. Additionally/alternatively, a vehicle device (e.g., vehicle device 66) may be directly (and/or wirelessly) coupled to a client electronic device (e.g., client electronic device 40) as illustrated with phantom link line 55. Thus, information may be communicated from a vehicle device (e.g., vehicle device 66) to a client electronic device (e.g., client electronic device 40), where the information may be communicated, e.g., to computer 12 via, e.g., a network (e.g., network 14). Smart phone 42 and vehicle device 68 are shown wirelessly coupled to network 14 via wireless communication channels 60a and 60b respectively established between smart phone 42 and cellular network/bridge 62 and vehicle device 68 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices (e.g., vehicle devices 64, 66, 68, 70) to be interconnected using a short-range wireless connection. Other forms of interconnection (e.g., Near Field Communication (NFC)) may also be used.

Figure 2:
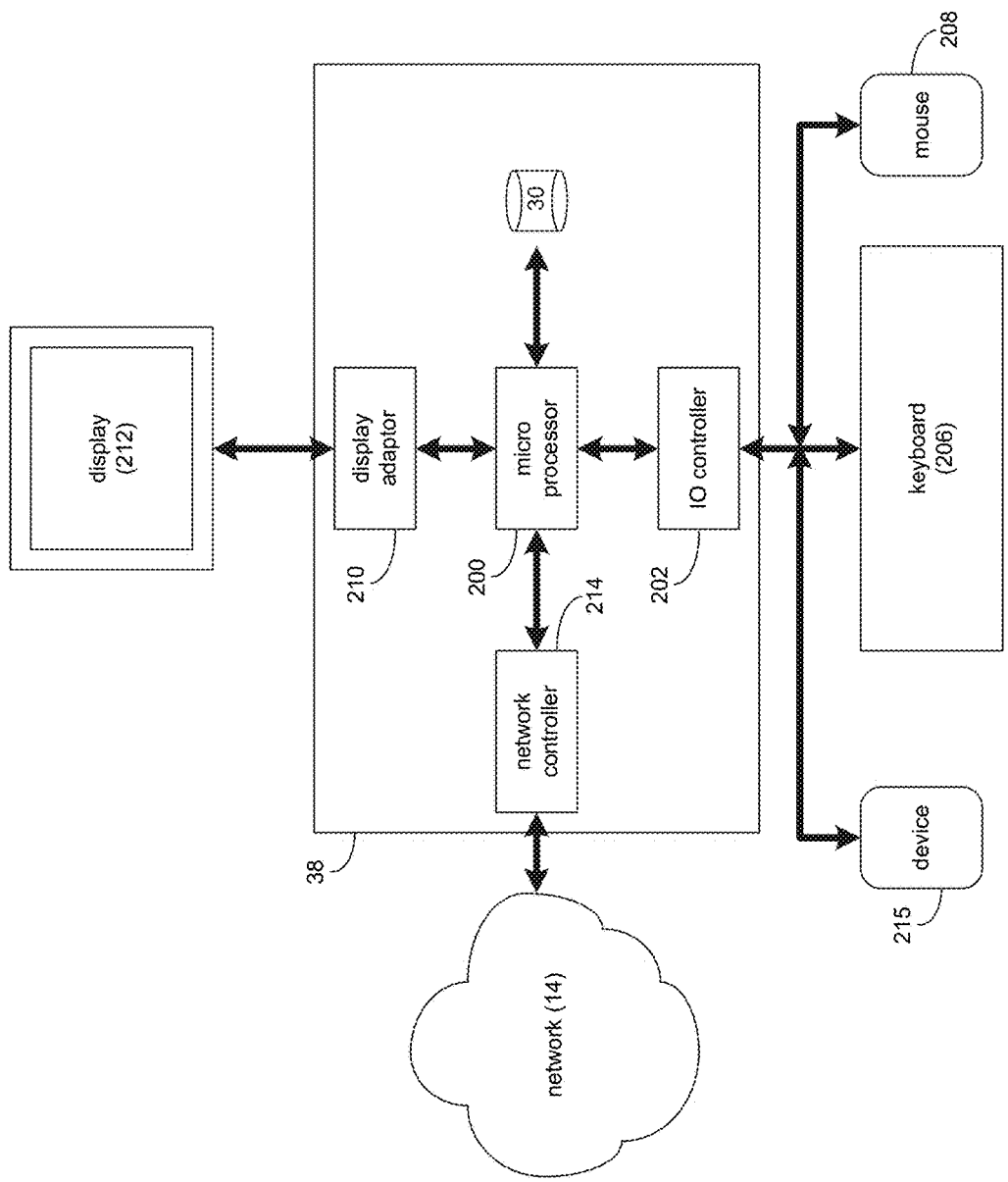
FIG. 2 is an example diagrammatic view of a client electronic device of FIG. 1 according to one or more example implementations of the disclosure.
Figure 3:
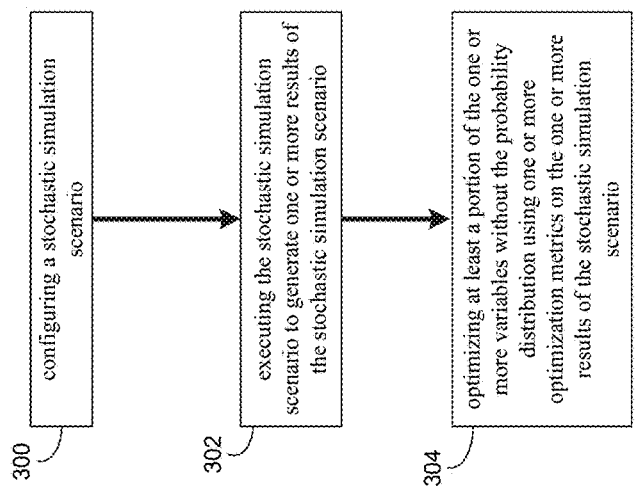
FIG. 3 is an example flowchart of a VA process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, VA process 10 may be substituted for client electronic device 38 (in whole or in part) within FIG. 2, examples of which may include but are not limited to computer 12 and/or client electronic devices 38, 40, 42, 44 and/or vehicle devices 64, 66, 68, 70.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As discussed above and referring also at least to the example implementations of FIGS. 3-39, vehicle autonomy (VA) process 10 may configure 300, by a computing device, a stochastic simulation scenario, wherein the stochastic simulation scenario may include one or more variables without a complete probability distribution. VA process 10 may execute 302 the stochastic simulation scenario to generate one or more results of the stochastic simulation scenario. VA process 10 may optimize 304 at least a portion of the one or more variables without a complete probability distribution using one or more optimization metrics on the one or more results of the stochastic simulation scenario.

Objects (e.g., vehicles) may be directly used by people, as well as via automation. For instance, self-driving cars may be available that may not rely upon user control. To ensure the self-driving car operates/navigates safely, it may be necessary to verify that the proper sensing and control algorithms (e.g., automation algorithms) are used. Traditional simulations may not adequately provide such verification. Verifying (e.g., validating) large-vehicle automation completely to the point of enabling fielding may present challenges. For example, due to the level of confidence needed, there should be no runaway large vehicles, and may require thoroughness that may not be immediately practical using traditional hardware facilities alone. Some simulations, even Monte Carlo simulation, may fail to completely address this issue. For complex scenarios, it may use imperfect probability distributions for unknown parameters. For example problems with high dimensionality, the simulation may inadequately sample these parameters, which may yield incorrect statistics.

However, as will be discussed in greater detail, VA process 10 may implement a randomizing multi-optimization technique for convoy algorithm validation. In some implementations, VA process 10 may execute a technique to actively seek out and identify (e.g., algorithmically) anomalies and corner cases that may cause vehicle (and/or convoy) failure. In some implementations, simulation-based testing may be cast as an optimization problem over one or more metrics on sampled statistical outcomes. By optimizing for selectively bad output statistics, parameters that may give anomalous behavior may be found. In some implementations, simultaneously optimizing performance for driver-model parameters may give realistic results. In some implementations, VA process 10 may (e.g., via simulation application 20) make use of high fidelity vehicle dynamics and terrain simulation, as well as GPU- or CPU-based sensor simulations. In some implementations, VA process 10 may be useful, e.g., for use in validating algorithms, with results that may be supported through module and system validation.

In some implementations, VA process 10 may be used generally with, e.g., large or small robotics and/or autonomous objects (e.g., vehicle types such as commercial, military, mining, agricultural, and transport vehicles, associated convoys such as large-scale functional convoys, etc.). Convoy operations may be complex, with factors such as numbers and types of vehicles, the nature of the cargo, the time of the convoy (e.g., day or night), the traveled surface, the surrounding terrain, and the operation mechanics (e.g., splitting and merging), to list a few. Despite the challenges, convoys may offer compelling automation. For example, the task requirements may be limited, control of one vehicle following another may be tractable, and there may be opportunity for human facilitation by selective introduction of drivers. However, proving that autonomous systems are safe may be difficult. While the disclosure may include examples of use with large autonomous military vehicles organized into convoys, it will be appreciated that other example vehicles, number of vehicles, and sizes may be used without departing from the scope of the disclosure.

It may be appreciated that very few vehicles, if any, are actually fielded with "full" autonomy. Instead, autonomous vehicles may generally be carefully watched and guided by a user. For example, some companies may have monitors in the cab, may restrict application, have passive drivers, and may be tested in cleared and walled areas. In some implementations, the lack of fielding may stem from concerns over safety. General autonomy algorithms may not be sufficiently robust, and the consequences of failure, e.g., a runaway multi-ton vehicle, may be too high.

Typically, researchers may attempt to address the worry over safety through hardware testing. For instance, systems may be run through exercises and studies in the field. However, it may be difficult to reproduce the great variety of events that a fielded autonomous system may encounter over its life. In some implementations, VA process 10 may be associated with digital simulation (e.g., via simulation application 20). Simulation may support many more hours of testing in a greater variety of situations at a lower cost, and may be scaled to more and larger computers, run day and night, and may be 100% safe.

As will be discussed below, in some implementations, the stochastic simulation scenario may include hardware-in-the-loop architecture associated with the stochastic simulation scenario. For example, digital simulation may be combined with hardware components (e.g., a hardware-in-the-loop approach) to add reality and incorporate proprietary algorithms (such as those in sensors and autopilots). Known sensor simulations include, e.g., cameras, LIDAR, GPS, radar, as well as simulation of vehicles and terrain.

In some implementations, VA process 10 may use sensor modeling techniques to leverage GPU programming to speed calculation and quality. In some implementations, VA process 10 may be implemented in parallel across multiple computers, each with multiple graphics cards, to create a faster computer environment for simulation. Digital simulation, through, e.g., parametric and Monte Carlo studies, generally have not offered adequate coverage of the situations and environments that may lead to failure. For instance, the corner cases that may fail, in the real world, may appear as vanishing probability events in most simulation models. In some implementations, this may be due to inaccurate probability distributions being applied to Monte Carlo simulation parameters.

For example, many probability distributions are not even knowable, e.g., they may depend on unstudied phenomena, human activities, or one-time events. Generally, variables not even having probability distributions are regarded as "profoundly unknown." In some implementations, it may be the neglect of profoundly unknown variables that may drive many simulations to discredit and disuse, as they may not provide results that are accurate enough, based on wise assessment from subject matter experts, to support mission planning and execution.

In some implementations, as will be discussed in greater detail below, VA process 10 may configure 300, by a computing device, a stochastic simulation scenario, wherein the stochastic simulation scenario may include one or more variables without a complete probability distribution. In some implementations, to advance autonomy, VA process 10 may be used to address these technical issues through, e.g., a stochastic optimizing autonomy Safety Testing Environment (STE) (e.g., via simulation application 20).

In some implementations, VA process 10 (e.g., via simulation application 20) may include a stochastic framework, including example modules for simulation of sensors, complex articulated mechanisms, vehicle terrain interactions, and representative environments. In some implementations, simulation application 20 may include a plugin framework that may support integrating third party algorithms and software for sensor simulation, vehicle models, autonomy, etc. In some implementations, the plugins may communicate with each other through a publish-and-subscribe paradigm implemented using the Data Distribution Services (DDS) standard. In some implementations the publish-and-subscribe communication protocol may conform to RSJPO interoperability profiles. This may enable others to quickly contribute new functionality through the plugin model, including, e.g., the autonomy and convoy control algorithms. It will be appreciated that services other than DDS that may or may not conform to RSJPO interoperability profiles may be used.

In some implementations, VA process 10 may apply these tools within an optimizing framework (e.g., via simulation application 20). In some implementations, to address the issues of profoundly unknown simulation parameters and the desire to specifically find corner cases, VA process 10 may apply the concept of simultaneously randomly simulating and optimizing performance, where the optimization may be performed over sample distributions coming from the randomization. For instance, an example and non-limiting starting architecture 400 for randomizing-optimization may be seen in FIG. 4. In some implementations, starting architecture 400 may be used to optimize a metric on a sampled distribution over a set of variables. Using this example architecture, VA process 10 may formally configure 300 and define algorithms, parameter distributions and simulation modules that may be configured and exchanged. In some implementations, the stochastic simulation scenario may use Monte Carlo analysis (e.g., for the optimization algorithm of the stochastic simulation). In some implementations, the optimization algorithm may include, e.g., Nelder-Mead, Hook-Jeeves, multidirectional search, implicit filtering, or other stochastic optimization algorithm (or combination thereof). In some implementations, a constrained optimization algorithm may be used, where failure modes for the autonomous system may be formulated as equality and inequality constraints. The input and output data maps, distribution metric, and simulation modules can similarly be exchanged.

In some implementations, multiple metrics, which may be competing, may be provided by VA process 10 and may be optimized over subsets of the unknown parameters. In some implementations, this multi-optimization, which can be implemented by retaining the simulation but sequentially changing the optimization parameters in FIG. 4, may be used to better find corner cases in an environment of improvement (such as one guided by a human or one subject to adaptive algorithms). In these example cases, the worst case environment may be sought subject to the best case response. It will be appreciated that the disclosure is not limited to environment vs. response, and that VA process 10 may be simultaneously optimizing the response of multiple drivers or systems, etc.

In some implementations, the above-noted software architecture may rely on, e.g., extensible markup language (XML) for the definition and configuration 300 of some or all of the simulation scenario. For instance, an XML configuration file may describe, e.g., the vehicles, sensors, actuators, environment, and other components applicable to the particular simulation desired. In some implementations, VA process 10 may include plugins to import a solid model and joint definitions, add sensors, and define actuators on the device (e.g., vehicle device 66) to assist in creating the XML configuration file. In some implementations, as the XML file is read into the system, each object defined within it may be instantiated within VA process 10 itself. In some implementations, this may be accomplished by having VA process 10 have knowledge of the XML token for the object and the corresponding function or method to call to create a new instance of the object. This may enable a new type of object to be defined via a run-time dynamic library, and instantiated via the XML system without requiring the software toolkit to be recompiled. It will be appreciated that languages other than XML may be used for the definition and configuration of the simulation.

In some implementations, as will be discussed below, VA process 10 may execute 302 the stochastic simulation scenario to generate one or more results of the stochastic simulation scenario, and VA process 10 may optimize 304 at least a portion of the one or more unknown variables using one or more optimization metrics on the one or more results of the stochastic simulation scenario. As shown in example FIG. 4, VA process 10 may include an optimization algorithm that may be responsible for optimizing 304 (e.g., minimizing/maximizing) the distribution metric of the executed 302 results by varying the input variables. In some implementations, the optimization algorithm may be held within an XML-specified container class. This may enable the particular algorithm to be specified at run-time for the execution 302. In some implementations, new algorithms may be implemented by VA process 10 deriving from a base algorithm class and compiling each into a dynamically linked library.

In some implementations, the stochastic simulation scenario may be randomized and digital. For instance, VA process 10 may include a randomizer algorithm for use in the above-noted digital simulation. In some implementations, the randomizer of VA process 10 may be responsible for running (e.g., a Monte Carlo) experiment on the simulation scenario, given a set of example input variables (labeled $x_1$ in FIG. 4) and calculating the distribution metric value (u in FIG. 4). In some implementations, VA process 10 may include one or more components, e.g., 1) the simulation and task to be performed, 2) the statistical distributions of randomized variables used to perform the Monte Carlo experiment, 3) the method to extract the output variables, and 4) the distribution metric. The randomizer of VA process 10 may contain a vector of validity conditions that may be used to determine if a given simulation run within a Monte Carlo experiment is valid. An example program flow 500 of the randomizing-optimizer portion of VA process 10 is shown is shown in FIG. 5.

Figure 5:
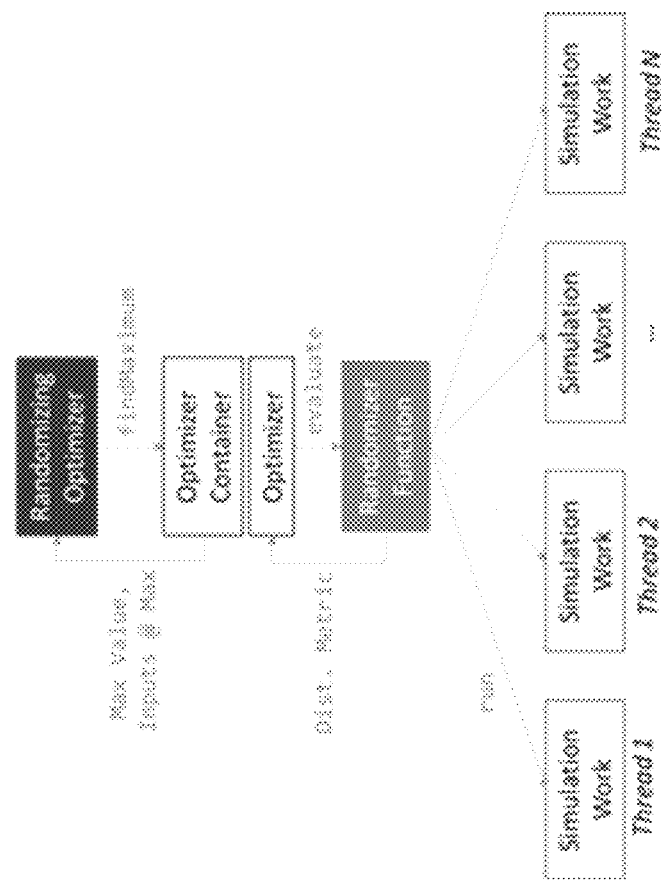
FIG. 5 is an example diagram consistent with the VA process according to one or more example implementations of the disclosure.
Figure 6:
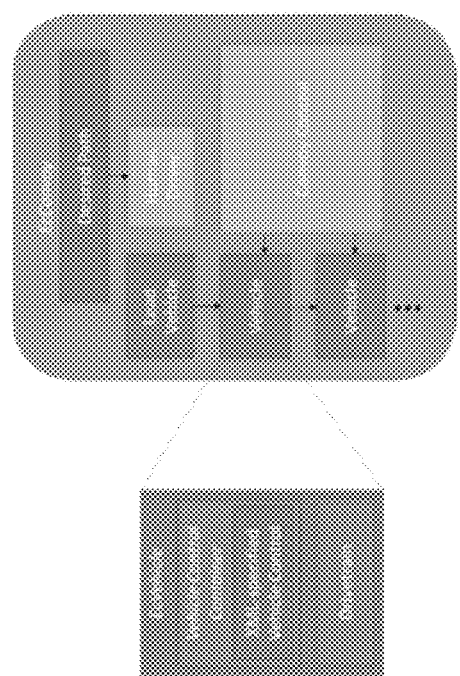
FIG. 6 is an example diagram consistent with the VA process according to one or more example implementations of the disclosure.

As shown in example FIG. 5, "Simulation Work" may be a helper class within the randomizer function of VA process 10. In some implementations, VA process may create an instance for each simulation run, and these instances may be placed in a queue. Worker threads may then be created, and the "Simulation Work" instances may be assigned to these threads. The simulation and task to be performed may remain constant across all simulation runs and Monte Carlo experiments with the example exception of the randomized and input variables. In some implementations, the randomized and input variables may be specified separately, which may enable easy reconfiguration and re-use in multiple scenarios and studies.

In some implementations, the software architecture components (e.g., vehicle and vehicle convoy components) may help fulfill two example purposes, e.g.: 1) enable easy storage and simulation of vehicles and vehicle convoys and 2) enable a user (e.g., via VA process 10) to easily swap in a new implementation of control algorithms and vehicle component models. The overall convoy simulation may exist one or more entities, e.g., the simulation backend and/or the vehicle and convoy architecture.

In some implementations, the stochastic simulation scenario may include at least one of an orbit, an asteroid, a comet, a planet, and a moon. In some implementations, the stochastic simulation scenario may include an autonomous convoy. For instance, in software, a convoy object may act as both an easily configurable and storable representation of the convoy, and as an interface class between the randomizing-optimizing framework control system of VA process 10 and the simulation backend. The convoy object (e.g., via VA process 10) may be responsible for storing descriptions of the convoy and individual vehicle configurations. For instance, and referring at least to FIG. 6, example class components of architecture 600 are shown with their relative relationships. The example vehicle class (e.g., EcVehicle class) may hold the geometric description, dynamic simulation properties, and controller of the vehicle to be used in the simulation scenario. The example convoy class (e.g., EcConvoy class) may hold all vehicles present in the convoy to be used in the simulation scenario, as well as a convoy controller. In some implementations, storing the convoy controller within the convoy, rather than the vehicle, may make for easier transfer of information to the individual vehicle controllers, facilitating more fully system-aware controllers. It will be appreciated that any of the architectures described throughout may vary without departing from the scope of the disclosure. As such, the specific architectures used throughout should be taken as example only and not to otherwise limit the scope of the disclosure.

Figure 7:
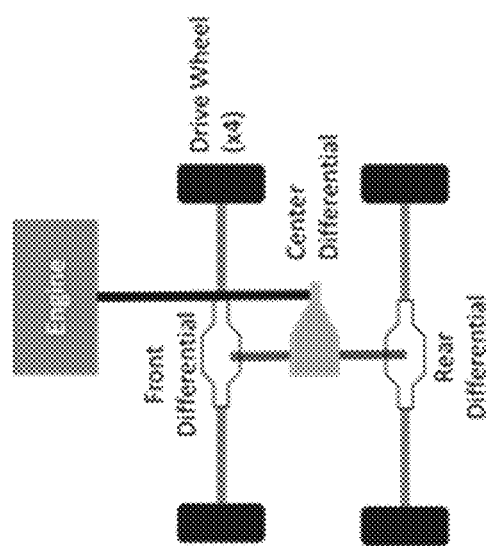
FIG. 7 is an example diagram consistent with the VA process according to one or more example implementations of the disclosure.
Figure 8:
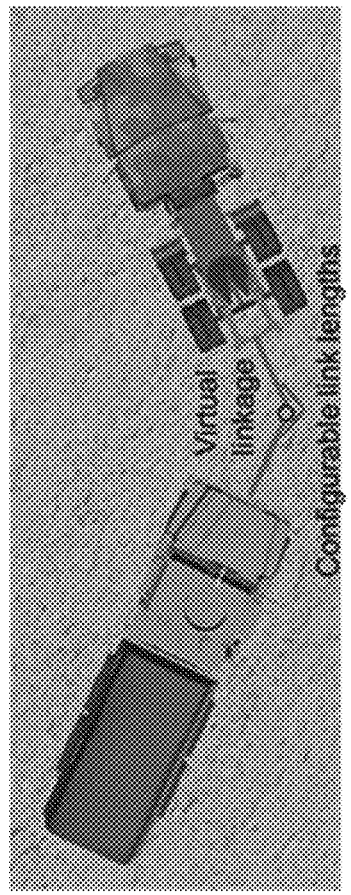
FIG. 8 is an example diagram consistent with the VA process according to one or more example implementations of the disclosure.
Figure 9:
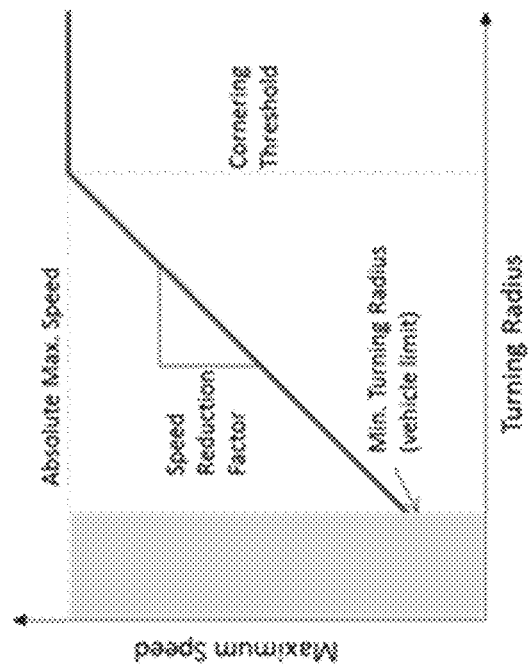
FIG. 9 is an example diagram consistent with the VA process according to one or more example implementations of the disclosure.
Figure 10:
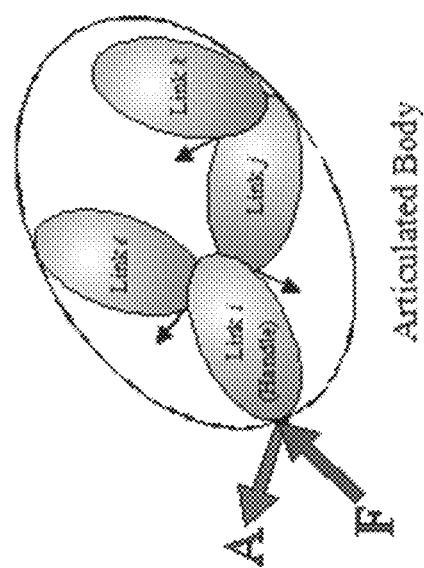
FIG. 10 is an example diagram consistent with the VA process according to one or more example implementations of the disclosure.
Figure 11:
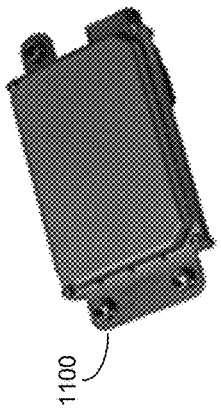
FIG. 11 is an example diagram consistent with the VA process according to one or more example implementations of the disclosure.
Figure 11:
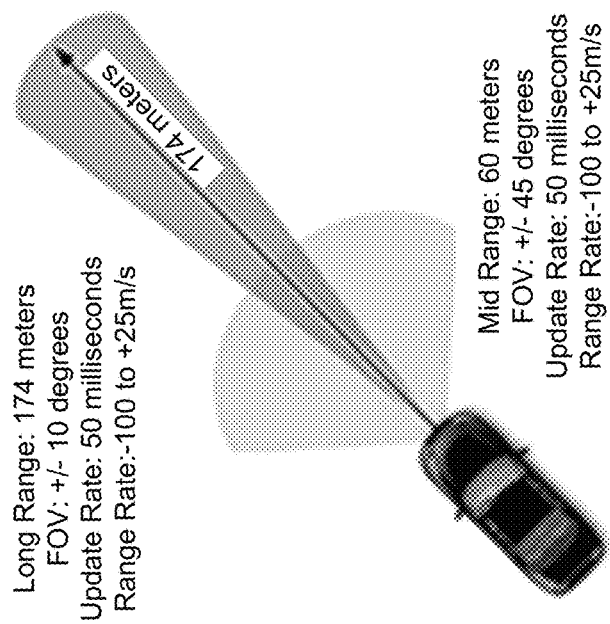
Figure 12:
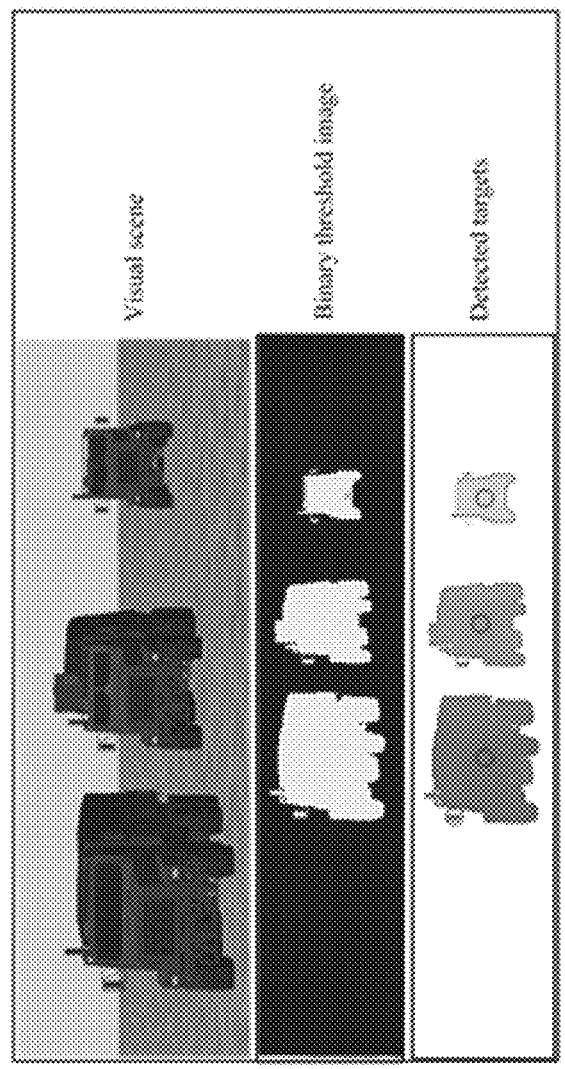
FIG. 12 is an example diagram consistent with the VA process according to one or more example implementations of the disclosure.

In some implementations, each vehicle in the simulation may contain its own drivetrain model, which may be responsible for calculating (e.g., via VA process 10) the individual wheel torques generated by the engine and transferred through differentials. This may enable users to chain together multiple components, such as internal combustion engines, differentials, gearboxes, wheels, etc., to form a model of the complete vehicle drivetrain for the scenario. In some implementations, this may be achieved as an additional layer on top of the dynamic model. An example drivetrain topology 700 is shown in FIG. 7. In the example FIG. 7, the gearbox and engine may be approximated as a single unit; however, it will be appreciated that any configuration of components may be used.

In some implementations, various types of vehicles may be used. For example, M915 (a 6×4 vehicle), AMK23 (a 6×6 vehicle), and AMK27. In the example, each model may have, e.g., 14 articulations: 6 rolling, 6 suspension, and 2 steering articulations as part of the drivetrain model. It will be appreciated that other vehicle configurations may be used without departing from the scope of the disclosure.

For ease of explanation, a basic convoy control system built on virtual linkages between vehicles will be discussed, however, it will be appreciated that various convoy control systems may be used. In the example, the basic convoy control system may include one or more components, e.g., the convoy controller, and the individual vehicle control. In the example, each vehicle may be assumed to have a virtual tow-bar, with a configurable length, attached to the front and back end. In the example, the desired position of the vehicle may then be calculated based on these lengths, with the example assumption that the virtual tow-bars are rigidly mounted to the vehicles at a specified angle (typically parallel to the longitudinal axis). This general example formulation 800 for a virtual tow-bar convoy controller is summarized in FIG. 8. In the example, the bar from each truck is connected via an example freely rotating spherical joint. In some implementations, the desired position calculated using this controller (e.g., via VA process 10) may be passed to the vehicle controller (e.g., via VA process 10) to control steering and acceleration.

In some implementations, a basic human driver model may be used to simulate behavior for the lead vehicle in the scenario. This example parameterized model, which may be based on the work of Macadam, may be included as part of either the input or randomized variables. In the example, the basic human driver model may use, e.g., sensory-motor transport delay, dynamic capabilities, and preferred driving behaviors. In some implementations, the basic human driver model may include modelling of the transport time delay between a stimulus and the control response. In some implementations, this delay may represent the time necessary for the driver to sense a stimulus, process it, determine the best corrective action, and respond. The basic human driver model may also include a speed control model with an absolute maximum vehicle speed (e.g., the maximum speed of the vehicle, the speed a driver is not comfortable exceeding, etc.) and a cornering aggressiveness measure to reduce the speed based on the turning radius. In the example, this may replicate the tendency of drivers to slow down through a turn, as shown via driver cornering aggressiveness modeling graph 900 in example FIG. 9. In the example, once the turning radius drops below the cornering threshold in the scenario, the speed may be reduced in proportion to the tightness of the turn.

In some implementations, the dynamics of how a human may respond to stimuli may be included in the human driver model, which may include, e.g., a metric of how aggressively the driver brakes and accelerates. In some implementations, an aggressive driver may be modeled as one who applies very high control inputs to achieve the desired vehicle speeds, while a conservative driver may use more gradual control inputs. In some implementations, this may be modelled using a PID controller, with the input being controlled to the desired value. In some implementations, by increasing the gains on this controller, the aggressiveness of the driver may be increased. The integral control action may allow a driver to be modelled as providing accurate control inputs, without significantly impacting their aggressiveness.

Figure 4:
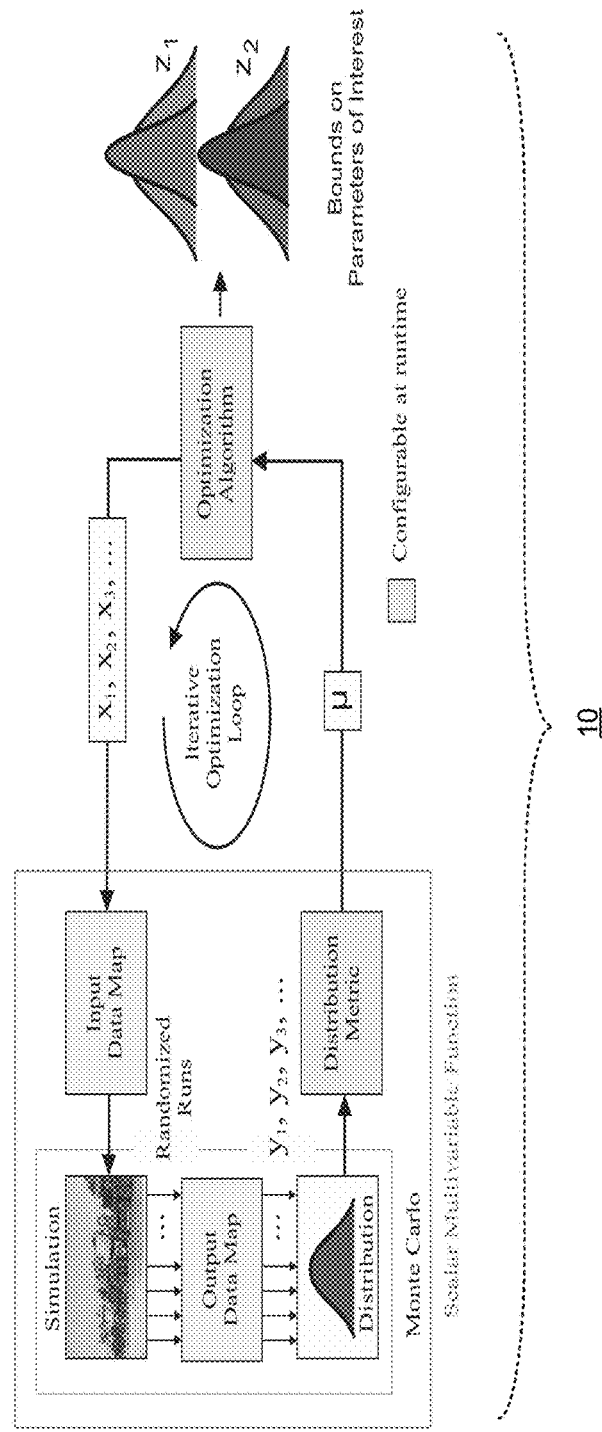
FIG. 4 is an example diagram consistent with the VA process according to one or more example implementations of the disclosure.

In some implementations, the simulation shown in FIG. 4 may use a dynamic simulation of the vehicles and environment. For example, this may be a full physics-based simulation that calculates (e.g., via VA process 10) some or all the forces and accelerations present in the system. The execution may be quick, and may be many times faster than real time, to enable many iterations of the optimization algorithm of VA process 10 over a function that may require many simulation runs for each evaluation.

In some implementations, dynamic simulation may require VA process 10 calculating the force response to impacts between bodies. For instance, the force response may be modeled as, e.g., a function of material type, object positions, and object velocities, etc. A physics-based force response model may return a force as a function of these properties. Since several models may be employed (and with customers possibly desiring to add their own), the architecture may be extendable. Any number of force processors may be used within the simulation, and they may be selected (e.g., via VA process 10) using the surface properties of the objects in contact within the simulated environment. For example, in some implementations, a spring displacement model may be used for the collision response implemented using knowledge of the penetration distance between two intersecting physical extents. It will be appreciated that other variations may be used without departing from the scope of the disclosure.

In some implementations, VA process 10 may use a friction force calculation using an example static and kinetic Coulomb friction model to give realistic forces in the convoy environment. The friction model may appropriately model, for example, the process by which a moving vehicle comes to rest. In some implementations, this technique may be based on the concept of a breaking spring. For example, the friction force may be calculated (e.g., via VA process 10) as a function of the relative position x and velocity ẋ. In the example, the friction model may be assigned two modes (e.g., kinetic and static). The determination of mode may be made using a virtual spring that when stretched past a prescribed position signals kinetic mode and otherwise signals static mode, with appropriate force models used in each mode.

In some implementations, VA process 10 may use an example articulated-body algorithm for simulation to give Order(N) runtime. This algorithm may enable very fast simulation of very complex mechanisms. For example, an articulated body may be a collection of connected articulating links, such as suspension components, axles, and wheels. An example articulated body 1000 is shown in example FIG. 10. Any single rigid body within the articulated body can be used as a handle for defining the relationship between force and acceleration. In the example, the torque produced on joint i due to the acceleration of the base may be the torque required to accelerate all the outboard links from the joint. This may be an additive term, that may be found by assuming all other joints are stationary.

In some implementations, associated with a handle may be a 6×6 articulated-body inertia $I^A$ that may satisfy the following example equation for a physically realizable frame acceleration (6×1) A:

$$F = I^A A + B. \tag{1}$$

Here, F is the 6×1 frame force that must be applied to the articulated body to achieve 6×1 frame acceleration A. (For vector force $\vec{f}$, moment $\vec{n}$, linear acceleration $\vec{a}$, and angular acceleration $\vec{\alpha}$, represented as 3×1 column vectors, $F=[\vec{f}^T \ \vec{n}^T]^T$ and $A=[\vec{a}^T \ \vec{\alpha}^T]^T$.) The 6×1 frame force B is a bias force that is a function of external forces on the links, internal forces on the links, gravity, and link velocities. B represents all contributors to the force on the link except acceleration A. It is the force required to produce no acceleration of the handle. Iterative formulas may be used for VA process 10 to calculate $I^A$ and B to give an efficient algorithm.

In some implementations, VA process 10 may use an example automotive radar simulation, using, e.g., an OpenGL-based rendering approach to model the field of view of the sensor, render a depth image of the scene, and identify targets using object detection applied to the depth image. Referring at least to example FIG. 11, an example automotive radar sensor 1100 is shown with two example sensing modes (e.g., long range and mid-range). In long range mode, the sensor (shown above) may have an example range of 174 m with an example horizontal field of view (shown below) of 20 degrees. In mid-range mode, the sensor may have an example range of 60 m and an example horizontal field of view of 90 degrees. In some implementations, the output of this sensor may be a list of detected targets, where each target may include the estimated size, position and velocity of the detected object.

In some implementations, the radar simulation portion of VA process 10 may use a rendering engine (e.g., of simulation application 20) to generate a depth image of the scene from the view perspective of the modeled radar sensor. VA process 10 may process this to detect coherent blobs (objects) from which the simulation backend (e.g., via VA process 10) may be queried to estimate each object's size, position and velocity, as shown in the example radar simulation 1200 in example FIG. 12. In the example, the mapping between detected depth image blob and known simulation object may be determined by VA process 10 using, e.g., a ray-tracing intersection test. In this test, a ray passing through the blob pixel centroid may be cast into the 3D scene from the radar's perspective projection and checked against the polygon meshes stored in the scene graph. When a known simulation object is intersected, its assigned radar simulation properties may be queried by VA process 10 and used to estimate its size, position and velocity. Relevant surface properties may be embedded into each simulated object (vehicle, building, pedestrian, or other environmental object) that may define how the radar signature of the object is calculated by VA process 10.

Figure 13:
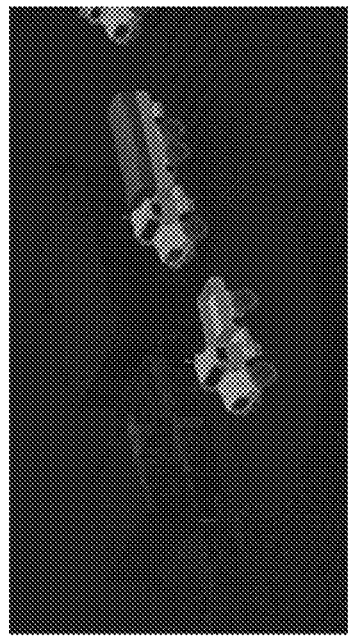
FIG. 13 is an example diagram consistent with the VA process according to one or more example implementations of the disclosure.
Figure 13:
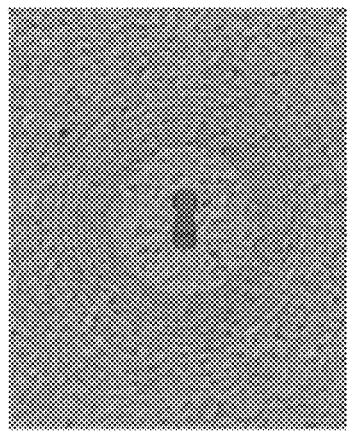
Figure 13:
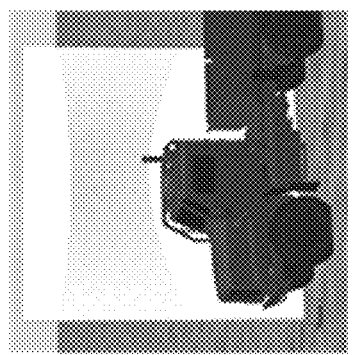
Figure 14:
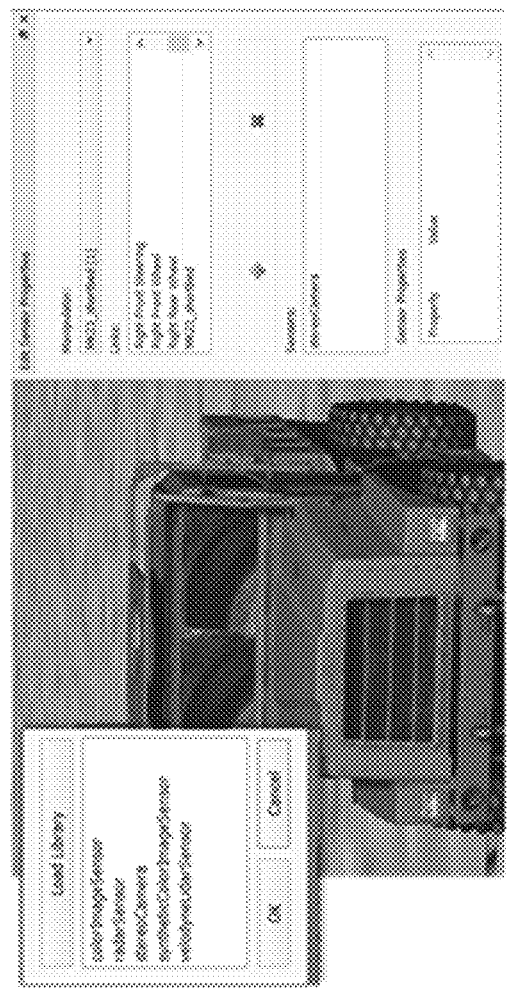
FIG. 14 is an example diagram consistent with the VA process according to one or more example implementations of the disclosure.
Figure 15:
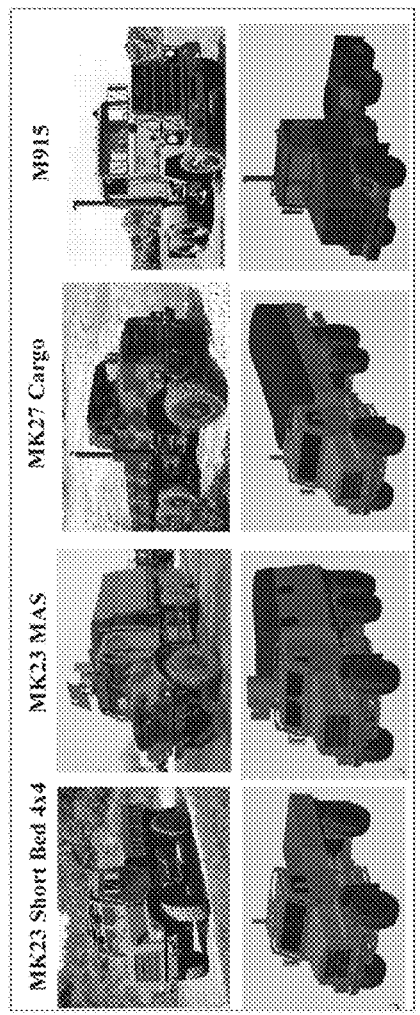
FIG. 15 is an example diagram consistent with the VA process according to one or more example implementations of the disclosure.

In some implementations, a LIDAR simulation may be used by VA process 10, with an example focus on a Velodyne HDL-32E. This example LIDAR may have 32 lasers mounted vertically on a rotating head. The head may rotate at 600 rpm providing angular resolution of 0.16 degree in the horizontal and 1.33 degrees in the vertical. The unit may return 700,000 points per second in the range of 1 to 70 meters from the head with 360 degree horizontal by 40 degree vertical field of view. An example LIDAR simulation 1300 is shown in example FIG. 13. As shown in FIG. 13, a LIDAR simulation with convoy vehicles showing the correctly simulated hemispherical projection of the Velodyne HDL-32E on a wall next to the vehicle (left), on a flat terrain (center) and on simulated buildings (right).

In some implementations, the LIDAR simulation may be optimized by VA process 10. For instance, VA process 10 may render the LIDAR views with multithreaded render camera objects and enable OpenGL context sharing. In this way, the LIDAR view may be rendered using a graphics context that may be shared with all other views of the scene graph. As a result, latency may be eliminated and/or reduced from frequent graphics context switching. In some implementations, the LIDAR simulation may be multithreaded and utilize one thread per active OpenGL view, plus a thread to process the returned depth images and publish the data.

In some implementations, VA process 10 may include a sensor configuration plugin to enable a user to, e.g., load sensor simulation libraries, add sensors to vehicles, and configure each sensor graphically. An example sensor configuration dialog user interface 1400 of VA process 10 is shown in example FIG. 14. In the example, the plugin may provide a sensor configuration widget that may provide online control of the sensor specific parameters. The sensor configuration widget may provide a drop down box for selecting a vehicle and location for sensor attachment. In some implementations, the user (e.g., via the user interface of VA process 10) may "click" or otherwise select a sensor to view and edit its properties graphically. The placement of a sensor may be modified using, e.g., an example visual dragger tool in the render window of the user interface. In some implementations, VA process 10 may enable sensor model libraries to be loaded dynamically at runtime to provide extensibility.

In some implementations, VA process 10 may include a model conversion process to convert commercially available military convoy vehicle models (e.g., intended for high fidelity renderings) into high quality, efficient simulation models. Examples of models 1500 that may be included are shown in example FIG. 15, and may be, e.g., the Medium Tactical Vehicle Replacement (MTVR) line of trucks in active duty and the M915 tractor. The MTVR variants converted for dynamic simulation may include the MK23 Short Bed 4×4, the MK23 MAS, and the MK27 cargo truck. It will be appreciated that other vehicles (and objects) may be used.

In some implementations, the conversion may enable VA process 10 to simplify the geometry of the original model for use in real-time simulation and rendering, configure the model to include all required parameters for dynamic simulation, and set bounding volumes used for collision handling. The models may come in various formats, such as a 3ds (via 3D studio max) or obj (via Wavefront) format. In some implementations, VA process 10 may read these directly or after processing in third-party software for geometry and texture cleanup.

Figure 16:
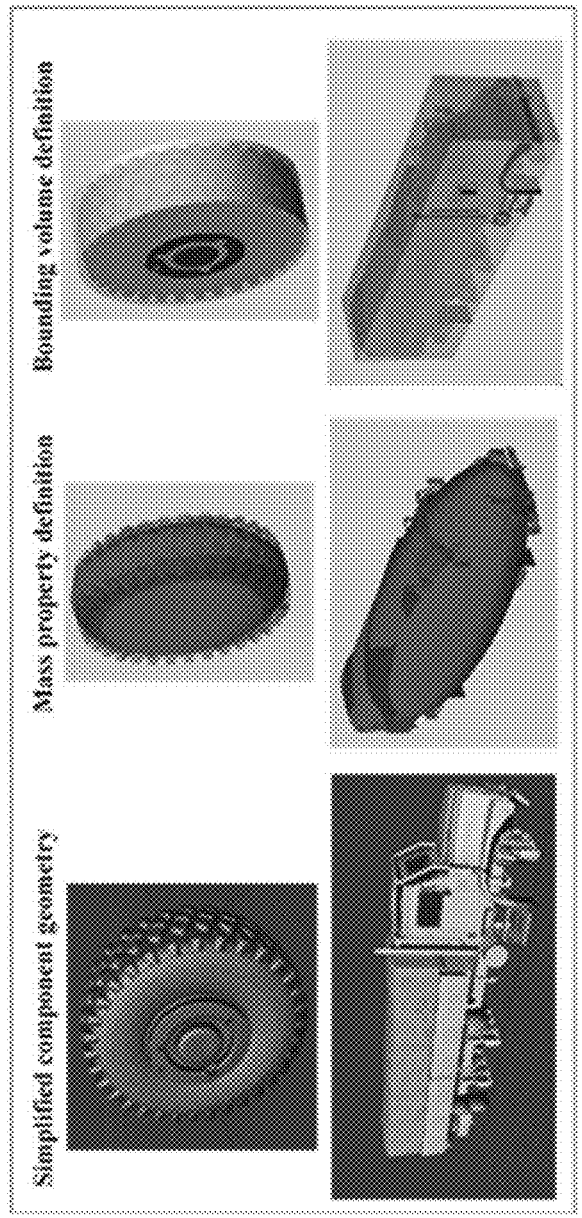
FIG. 16 is an example diagram consistent with the VA process according to one or more example implementations of the disclosure.
Figure 17:
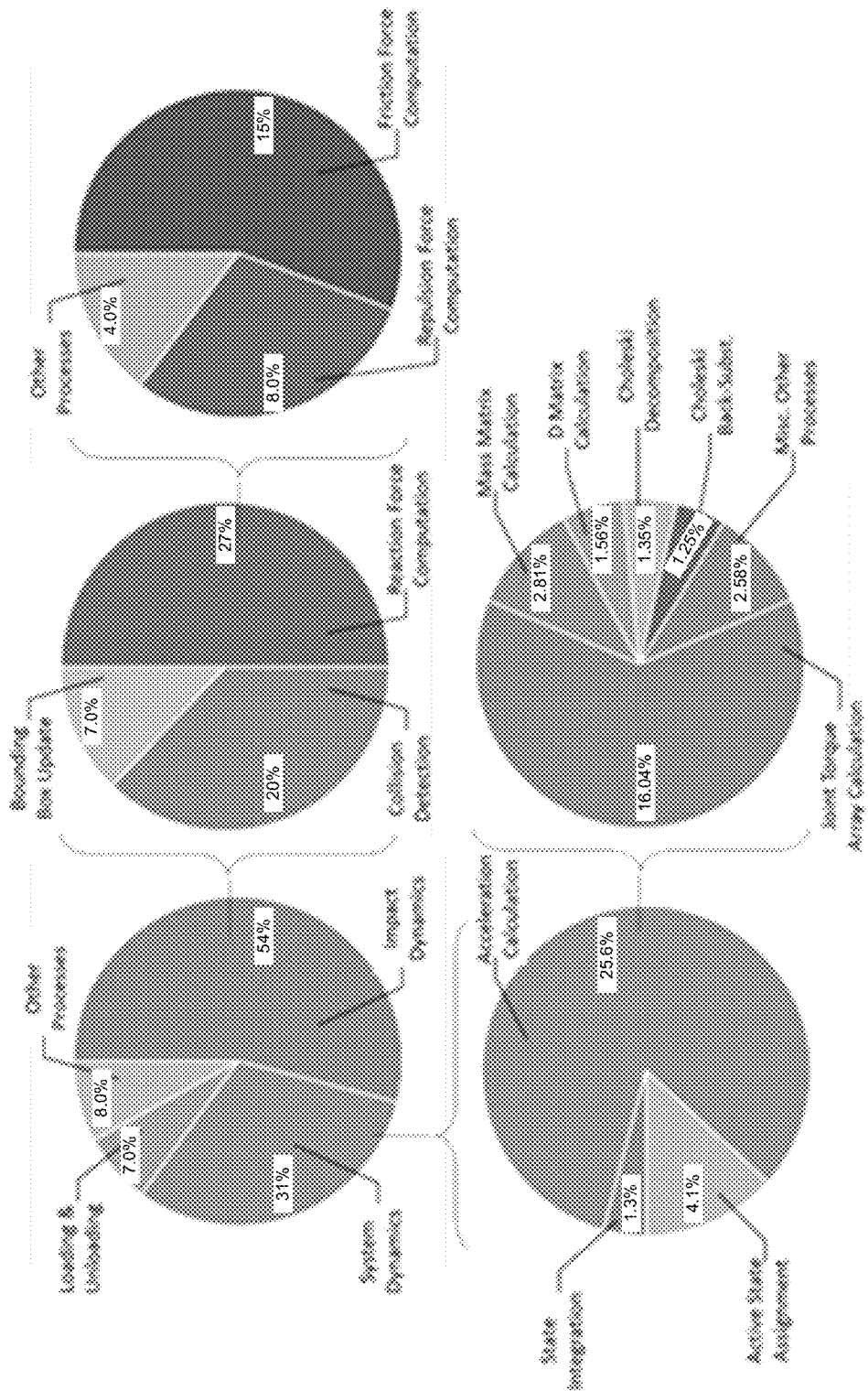
FIG. 17 is an example diagram consistent with the VA process according to one or more example implementations of the disclosure.

In some implementations, graphical tools may be used (e.g., via VA process 10) to configure properties related to both the physical components (e.g., mass, actuator, and surface friction properties) and numerical algorithms (e.g., bounding volumes, integration scheme, and time step). An example of simplified geometry models 1600 are shown in FIG. 16. In the example FIG. 16, the visual representation of wheel and chassis of the truck may be imported by VA process 10 with configured mass properties and collision bounding volumes is shown. In some implementations, the vehicle components may be combined into an articulated dynamic model using an example manipulator builder tool of VA process 10, which may define, among other things, a bifurcating chain starting with the chassis as the base link.

In some implementations, speed in execution may be beneficial. An in-situ profiling tool (e.g., Sleepy or the like) may be used with VA process 10 while running a set of convoy-simulation experiment scenarios. In some implementations, as shown in the example profiling analysis 1700 of FIG. 17, the computational burden may fall in one or more groups e.g.: control output calculation, collision detection, dynamics calculations, and sensor simulation. While not shown, it will be appreciated that sensor simulations may also be included in the analysis. The results shown may be based on a sampling-based statistical profiler, with a sampling time of 30 seconds. For this example analysis, a single simulation thread may be used to eliminate computation related to thread management.

In some implementations, two components of VA process 10 may require the majority of processing time, e.g.: the system dynamics (e.g., the calculation of accelerations, velocities and positions based on applied torques and forces) and the impact dynamics computations, which may include collision detection, penetration depth calculation, and repulsive and friction force computations. Within the impact dynamics component, the largest single contributor may be the computation of friction forces. This may require the computation of multiple matrix inverses and may be generally computationally intensive (since the friction mode must first be determined, and the actual friction forces calculated). The repulsive force computation may be also expensive. In some implementations, the resulting convoy simulation may be run at approximately 40 times real time (e.g., on a desktop PC). It will be appreciated that the resulting convoy simulation may be run at less than or more than 40 times real time without departing from the scope of the disclosure.

Figure 18:
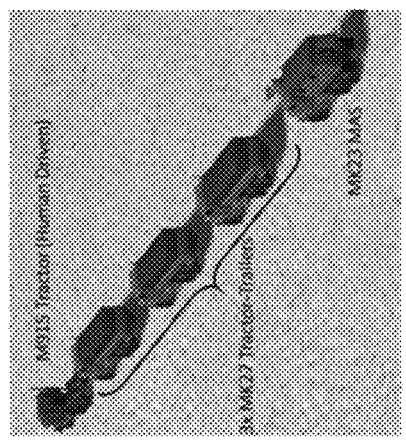
FIG. 18 is an example diagram consistent with the VA process according to one or more example implementations of the disclosure.
Figure 18:
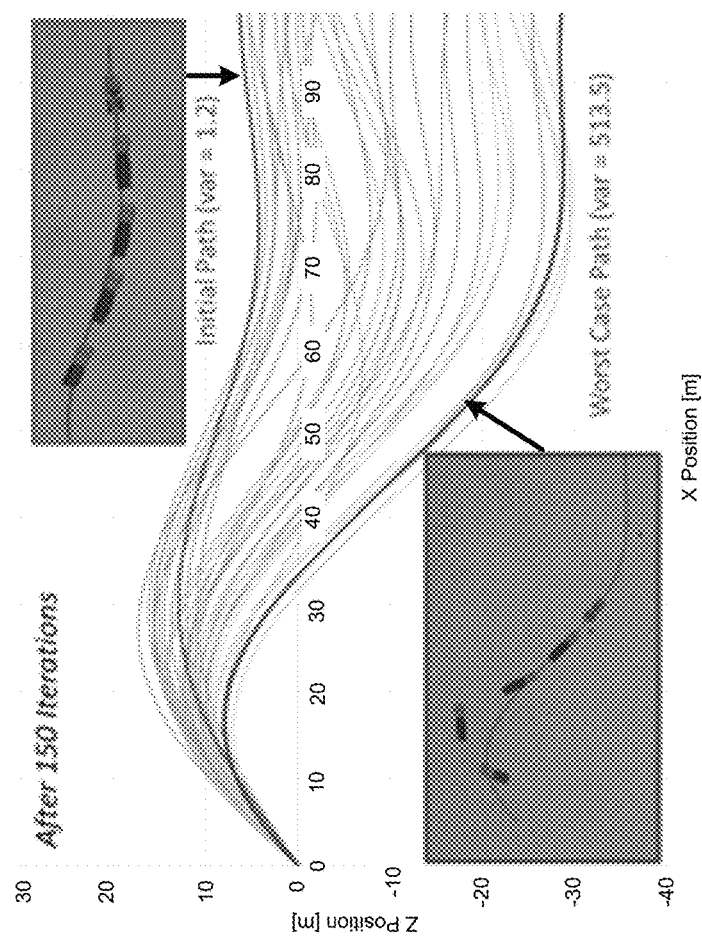

In some implementations, and referring at least to the example path optimization results 1800 of FIG. 18, it is shown the example capabilities of both the randomizing-optimizing framework, and the dynamic simulation engine of VA process 10. In the example, experiments within the randomizing-optimizing framework are built around a five-vehicle convoy, with a human-driven M915 tractor leading, followed by three MK27 cargo trucks and an armored MK23 MAS variant in the rear. VA process 10 may tune the vehicle models to provide fast dynamic simulation of the convoy at the level of fidelity desired for the experiments. It will be appreciated that the above-noted experiments are examples only, and that other experiments may be used.

In some implementations, the one or more optimization metrics may include a threshold measure of variance. For instance, to investigate convoy stability with respect to the lead vehicle's path, the randomizer-optimizer may be used to find the path that leads the convoy into a failure state defined as a threshold on the variance in the distance between the first and last vehicle. This failure state metric may provide a rough measure of how effectively the controller managed the convoy. In the example, the path may be generated by VA process 10 as a sum of sinusoidal components, using a Fourier series. For a path travelling in the X-Z plane, in the positive X direction, this path may be calculated as $$z(x) = C_0 + \sum_{i=1}^{N} C_i \sin(\omega_i x + \phi_i) \qquad (2)$$

Here, $C_i$ is the coefficient on the i-th component, $\omega_i$ is its frequency, and $\phi_i$ is its phase. $C_0$ is calculated such that $z(0)=0$, to ensure the path aligns with the starting position of the vehicle.

In some implementations, the number of components may be varied to provide more extensive control of the path shape and number of constituent frequencies. For the example demonstration, three components were used (yielding nine total degrees of freedom in the input to the function). This provided a reasonable compromise between the run time of the analysis, and the flexibility of the path generator. It will be appreciated that more or less components, as well as differing components, may be used without departing from the scope of the disclosure.

In the example, the rear tow-bar on each vehicle is 5 m, and the front tow-bar is 2 m, giving a nominal vehicle following distance of 7 m. The human driver model may be a basic PI controller based on vehicle position and the desired path to be followed. In some implementations, to simulate basic human driving behavior, the maximum commanded speed of the vehicle may be reduced in direct proportion to the steering angle. The randomizing-optimizer of VA process 10 may be configured to maximize the variance of the distance between the leading and tailing vehicles using, e.g., Nelder and Mead's algorithm, over the domain of the frequencies, phases and coefficients of the sinusoidal path components. In some implementations, the mass of each vehicle may be randomized with a standard deviation of, e.g., 7% of the nominal mass, with 30 randomized trials being performed for each Monte Carlo experiment set. More or less standard deviation and randomized trials may be used.

As noted above, this example scenario may be run using the randomizing-optimizing framework. In some implementations, the end result may be a set of "worst case" input variables defining a desired vehicle path (e.g., in the fear vehicles). This path, along with the initial condition path showing stable convoy following behavior, is shown in FIG. 18. In some implementations, these example results may be determined after approximately 150 iterations of the Nelder-Mead algorithm, although more or less iterations may be used. In some implementations, each trial may be run in its own thread, with six concurrent threads used for evaluation.

In some implementations, VA process 10 may identify a failure that may occur, e.g., when the collision avoidance system of the simulation commands a rapid braking maneuver to avoid collision. An example of the associated collision control logic 1900 of VA process 10 is shown in example FIG. 19. In the example, the sudden deceleration results in the front end of the vehicle diving downwards and the obstacle exiting the field of view of the radar system. With no obstacle in view, the vehicle then begins to accelerate once again. This failure may help show the complex interplay between sensors, control logic, and vehicle dynamics.

Figure 19:
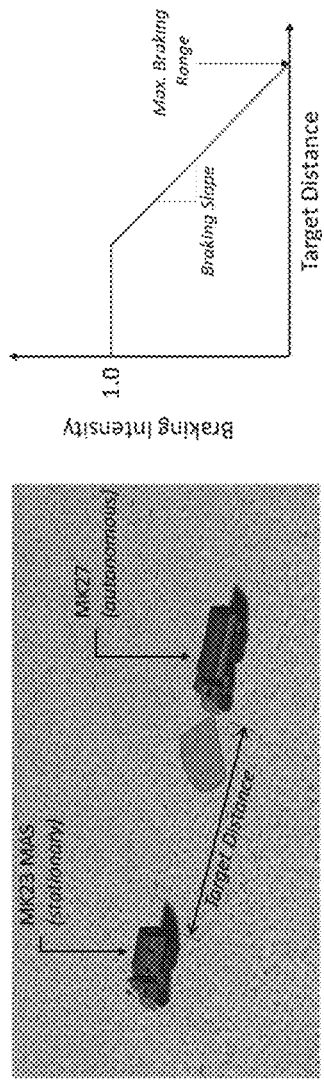
FIG. 19 is an example diagram consistent with the VA process according to one or more example implementations of the disclosure.
Figure 20:
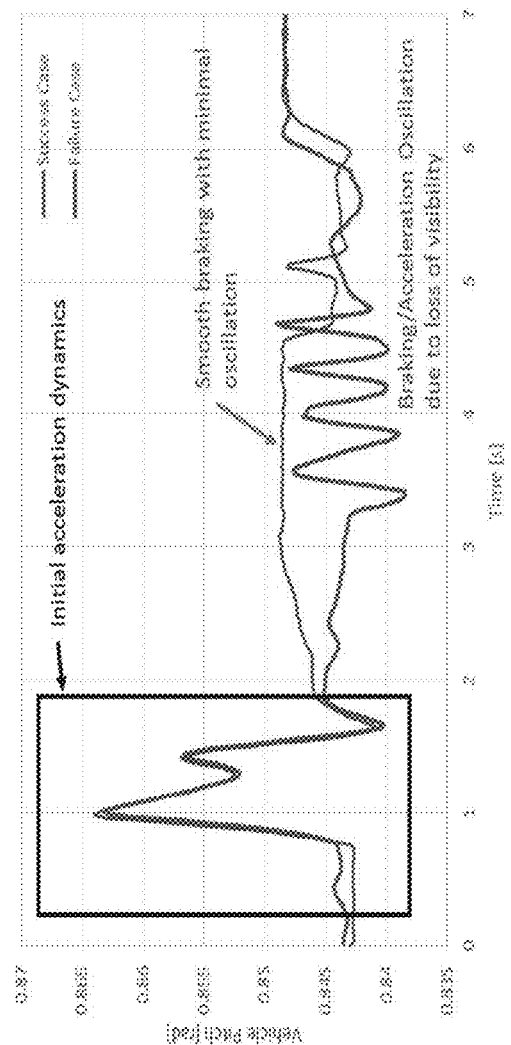
FIG. 20 is an example diagram consistent with the VA process according to one or more example implementations of the disclosure.

In some implementations, the collision avoidance logic may be based on feedback from a simulated radar sensor mounted on the autonomous vehicle, as illustrated in FIG. 19. In some implementations, the control logic of the collision avoidance system may enable specific parts of this logic to be more thoroughly studied. In the example, no attempt is made to steer around an obstacle, rather, once the object comes within a certain distance, the brakes are applied and the vehicle brought to a stop. The acceleration/braking response may be defined by the maximum braking distance and the braking slope. The maximum braking distance may define the farthest range at which a radar target will trigger the brakes to begin to be applied, and the braking slope may define how quickly the braking intensity is increased as the target is approached. In the example, an autonomous MK27 (with simulated radar sensor-based braking logic) may avoid collision with a stationary MK23 (left). Braking behavior may be defined by the slope of the increase with range, and the maximum range at which the brakes are applied. A braking intensity of 0 may indicate no braking action is being applied, while an intensity of 1 may be sufficient to lock up the wheels (right).

In some implementations, the domain variables may be chosen (e.g., via VA process 10) to be the braking slope and maximum braking range defined above. The randomized variables may be chosen (e.g., via VA process 10) as the vehicle payload mass and the stiffness of the suspension system (e.g., both front and rear). The output variable may be selected (e.g., via VA process 10) as the distance between the autonomous vehicle and the obstacle. The distribution metric may be chosen (e.g., via VA process 10) to be the variance of the output distance.

In some implementations, the above-noted randomizing-optimizer may be run using the example scenario shown in FIG. 19. In the example, after approximately 118 iterations of the Nelder-Mead optimizer, the failure point may be found (e.g., via VA process 10). In some implementations, the failure mode may be substantially similar to that observed during live physical vehicle testing. A sudden braking motion may cause the front end of the vehicle to dive, resulting in a loss of obstacle recognition by the radar. The collision avoidance controller may then allow the system to speed back up. This behavior may repeat several times before finally bringing the vehicle to a stop. An example of the changes in vehicle pitch 2000 in normal smooth braking versus the oscillatory behavior found using the 118 iterations of failure seeking with the randomizing-optimization framework may be shown in example FIG. 20.

In some implementations, testing may be extended using the technique in FIG. 4 to optimize 304 over multiple parameters, which may enable competing objective functions, such as a driver model seeking best performance in parallel with road shapes selected for worst performance. In some implementations, to test the concept, VA process may use points over a unit of terrain that must be visited in turn by a convoy, where it may be desirable to minimize the path length to visit all the points with the added complexity of a benefit for more precise point selection. Finding shortest tours through points may correspond to the traditional Traveling Salesman Problem (TSP), which in the general case may be intractable by all known methods. There is no known polynomial-time solution, and a problem with 100 general visitation points is not necessarily able to be solved using today's computers and algorithms.

Instead, VA process 10 may focus on approximating the solution quickly. For example, VA process 10 may find the best algorithm in a class, while finding the worst-case level of randomization of points for that best solution method. In some implementations, the two optimizations 304 may be, e.g., 1) best solution method, and 2) worst point randomization. In some implementations, to define the family of distributions, 100 points may be selected (e.g., via VA process 10) by offsetting 100 points in a 10×10 grid each with a random x-value and a random y-value selected from a Normal distribution with standard deviation σ. That is, each point $p_{i,j}$ with i and j varying from 0 to 9, may be calculated using the following equation:

$$p_{i,j} = \begin{bmatrix} 0.5 + i + N(0, \sigma) \\ 0.5 + j + N(0, \sigma) \end{bmatrix} \quad (3)$$

Figure 21:
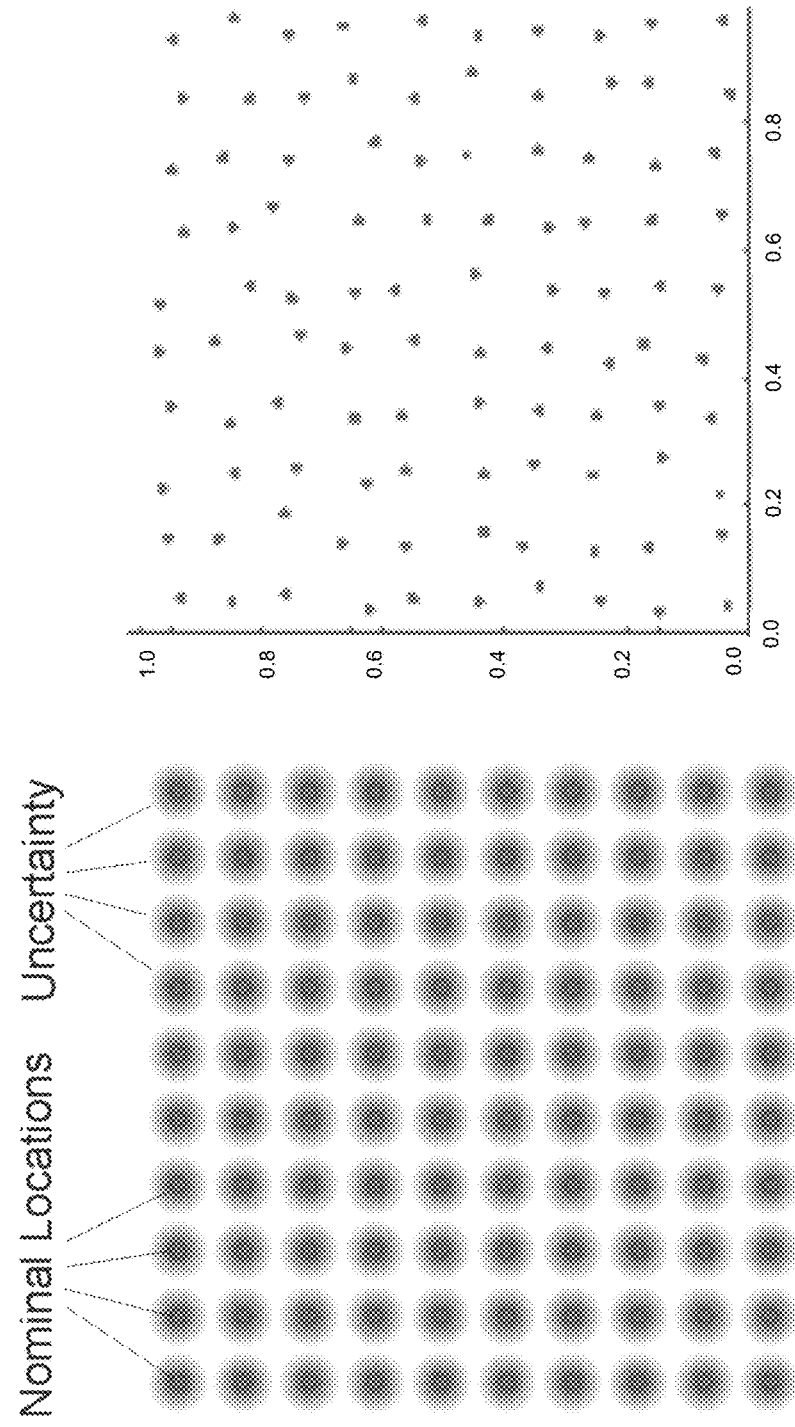
FIG. 21 is an example diagram consistent with the VA process according to one or more example implementations of the disclosure.
Figure 22:
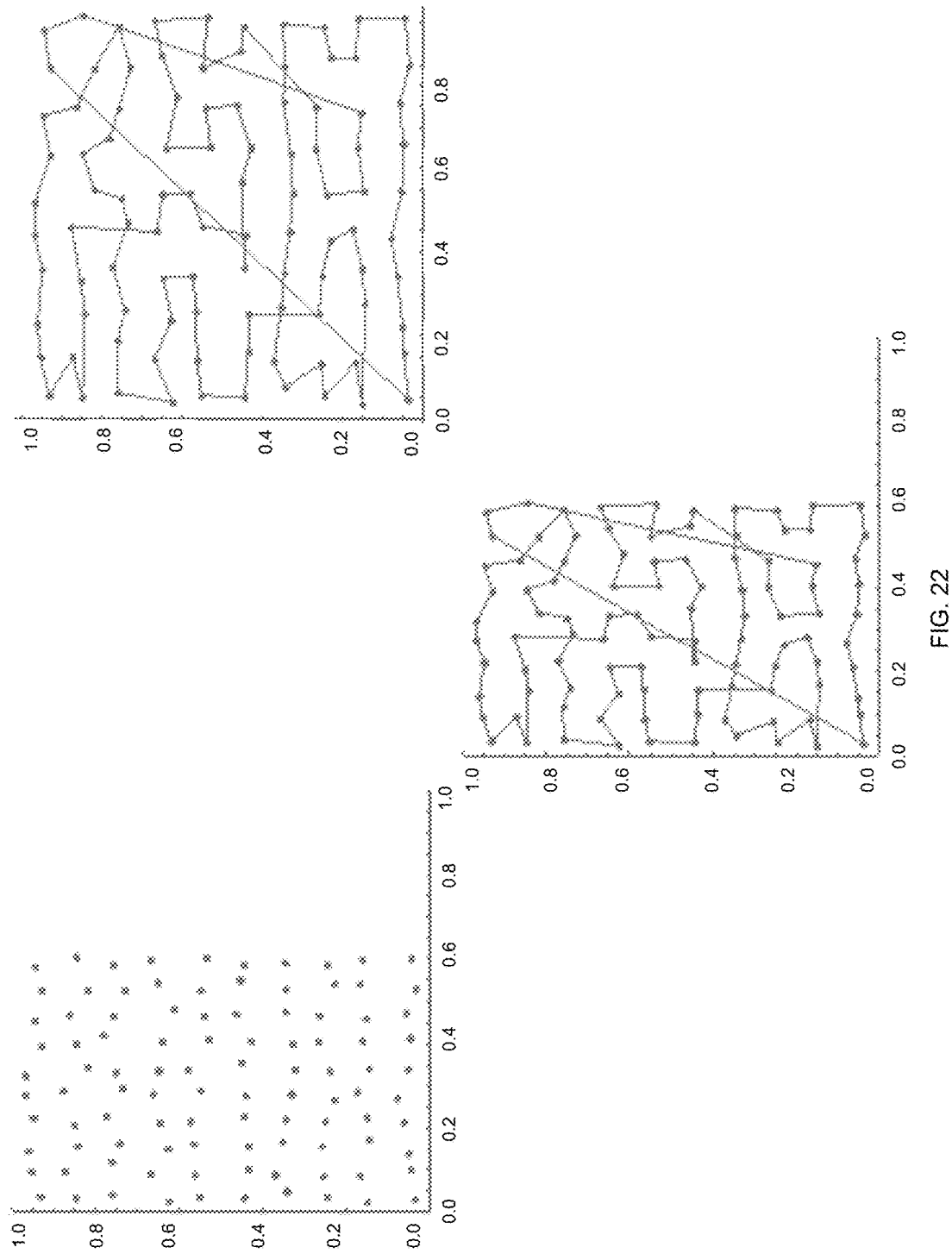
FIG. 22 is an example diagram consistent with the VA process according to one or more example implementations of the disclosure.

An example distribution of the terrain visitation points 2100 is shown in example FIG. 21. In the example, the terrain visitation points may be calculated by randomly modifying a nominal grid of points, as shown on the left. Using σ=014 (an example value that may be found to be optimal) with a Normal distribution over a 10×10 grid may give an example instance as shown on the right. These are the points that must be visited in a tour. Finding an optimal tour for 100 general points may be an intractable problem. In the example, the best tour through these points, ending where starting, may be estimated by VA process 10 first compressing the points along the x-axis by multiplying all x-coordinates by λ, then using a greedy algorithm to calculate the path. A greedy algorithm at each step may take the nearest next point. For a compression value of λ=0.63 (an example value that may be found to be optimal) may be used, this may give what is shown in FIG. 22 on the left. A path may be calculated using a greedy algorithm, as shown in FIG. 22 center, with re-expanded results as shown in FIG. 22 on the right.

In some implementations, compressing the points along the x-axis may have the benefit of guiding the algorithm into row motions, which may improve overall efficiency. Improvement through this method may increase when the points are closer to the nominal grid values (that is, σ is small). To model the cost of traversal and the benefit of liberty in selecting points, let the total cost of any tour of the points be given by the following:

$$\mu = P - 100\sigma, \quad (4)$$

where P is the path length and $\sigma$ is the standard deviation defining the selection of the points. This may model that there is a benefit to more precisely specifying points even if the path length increases. The tradeoff in the example is chosen as 100 (which may be arbitrary for this example).

With this, VA process 10 may use randomizing-optimizing simulation to find the best algorithm as defined by $\lambda$ that may counter the worst-case point distribution as defined by $\sigma$. This may require optimizing $\lambda$ to reduce $\mu$ as defined above while at the same time optimizing $\sigma$ to increase $\mu$. To do this, VA process 10 may score a set of $\sigma$ and $\lambda$ by executing 302 M tour calculations over N instances of points, which may then be optimized 304 using, e.g., the Nelder-Mead algorithm. The result may be a pair of $\{\sigma, \lambda\}$ values of $\{0.0136811, 0.626622\}$. Thus, the optimal scaling factor $\lambda$ for the greedy algorithm given a standard deviation that is the most effective adversary is 0.6266.

Figure 23:
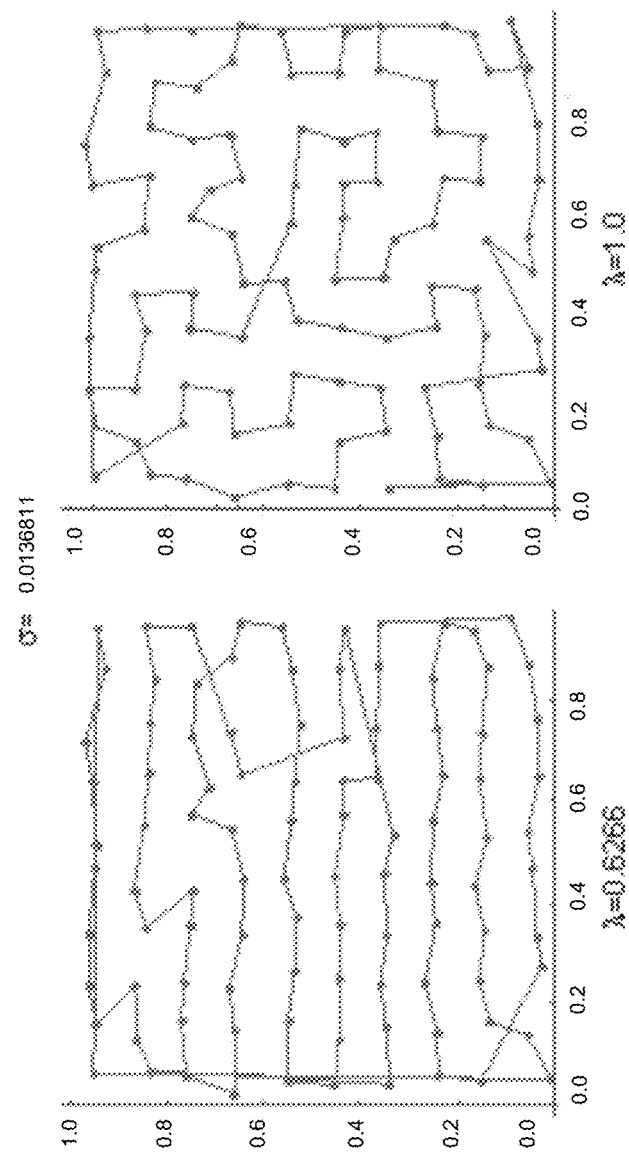
FIG. 23 is an example diagram consistent with the VA process according to one or more example implementations of the disclosure.

In some implementations, and referring at least to FIG. 23, comparison results 2300 for $\sigma = 0.013811$ are shown. In the example, over 400 runs of randomization, using $\lambda = 0.6266$ and comparing it with $\lambda = 1$, which corresponds to the default greedy algorithm, may give score improvement of 1.334. This value makes the average path length with compression larger, but gives the best score. These example results may show the benefit of simultaneously optimizing multiple parameters.

In some implementations, the core randomizing-optimizing system architecture of VA process 10 discussed with regard to FIG. 4 may be augmented with additional features designed to both make the system compatible with a wider range of convoy-relevant problems and to provide more robust failure mode seeking and detection.

In some implementations, many variables and parameters associated with a simulation may not be continuous. In some implementations, certain control methods may be either on or off, a vision system may use images from camera 1, 2 or 3, etc. or a drive system may be in either a low or high gear. Including support for these discretely-valued variables may provide a fully functional framework.

In some implementations, many variables may have fundamental or practical limits that should not be exceeded. For example, the mass of a vehicle or a coefficient of friction may both be greater than zero. By incorporating an additional cost function into the optimization metric, the optimizer of VA process 10 may be driven away from exceeding these limits.

In some implementations, the user may have flexibility to define the convoy's mission, with easy, interactive interfaces and menus for VA process 10. For example, a user may be able to define a lead vehicle's path by simply specifying the desired final position and intermediate waypoints via an interactive visual interface of VA process 10 to define the scenario in which the stochastic optimizing framework may search for a failure.

In some implementations, the architecture shown in FIG. 4 may be extended to optimize across multiple (possibly intentionally conflicting) relevant metrics focused on, e.g., convoy simulation. VA process 10 may be capable of handling unknown and uncertain parameters, and driver and algorithmic models that may adapt and evolve in reaction to changing conditions. The multi-optimization approach of VA process 10 may be performed by, e.g.: controlling transitions among a set of P optimizations. Each optimization may address a different convoy-relevant metric over a different subset of the state, using as the other part of the state the results from the previous optimization.

Figure 24:
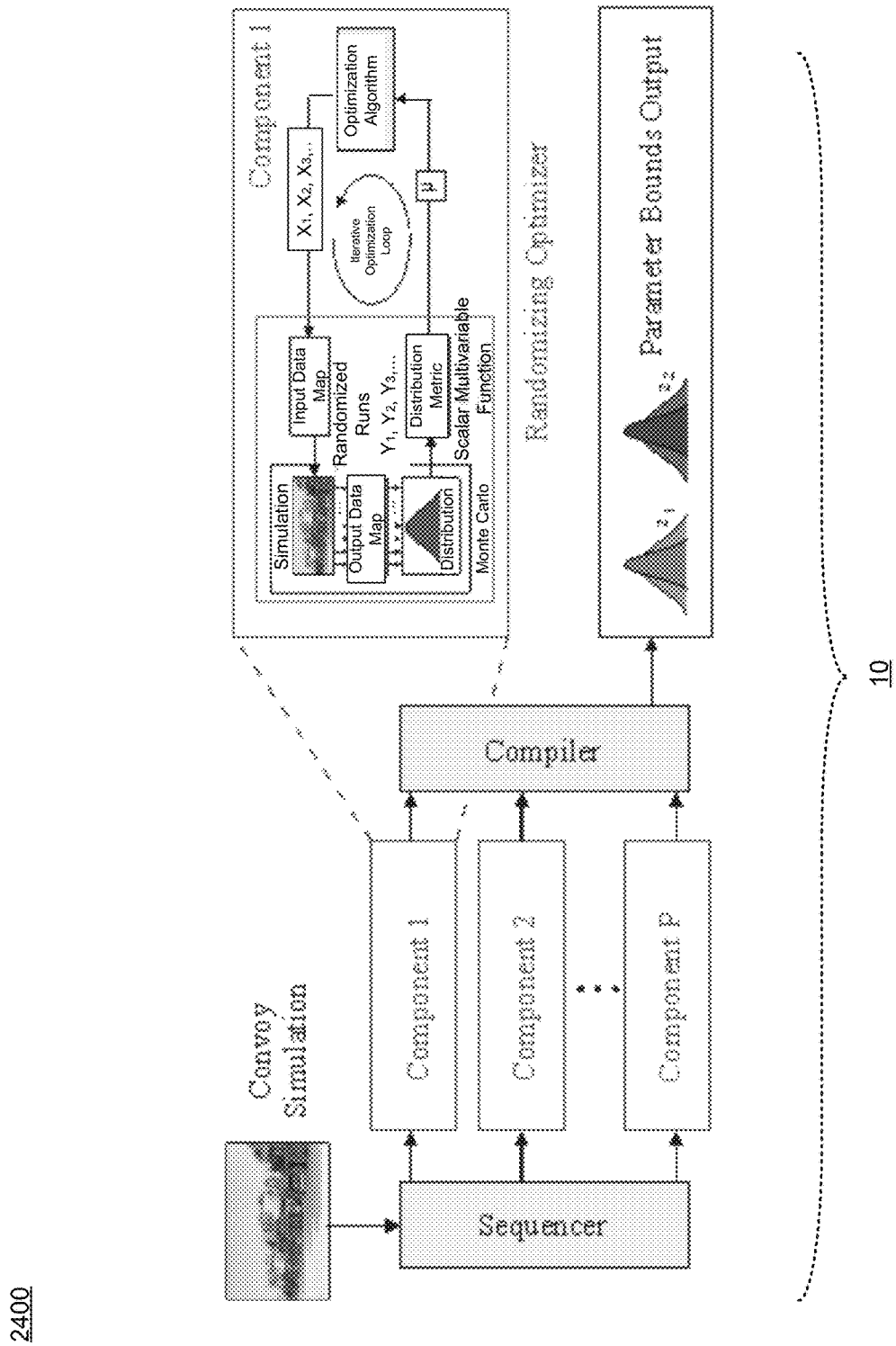
FIG. 24 is an example diagram consistent with the VA process according to one or more example implementations of the disclosure.
Figure 25:
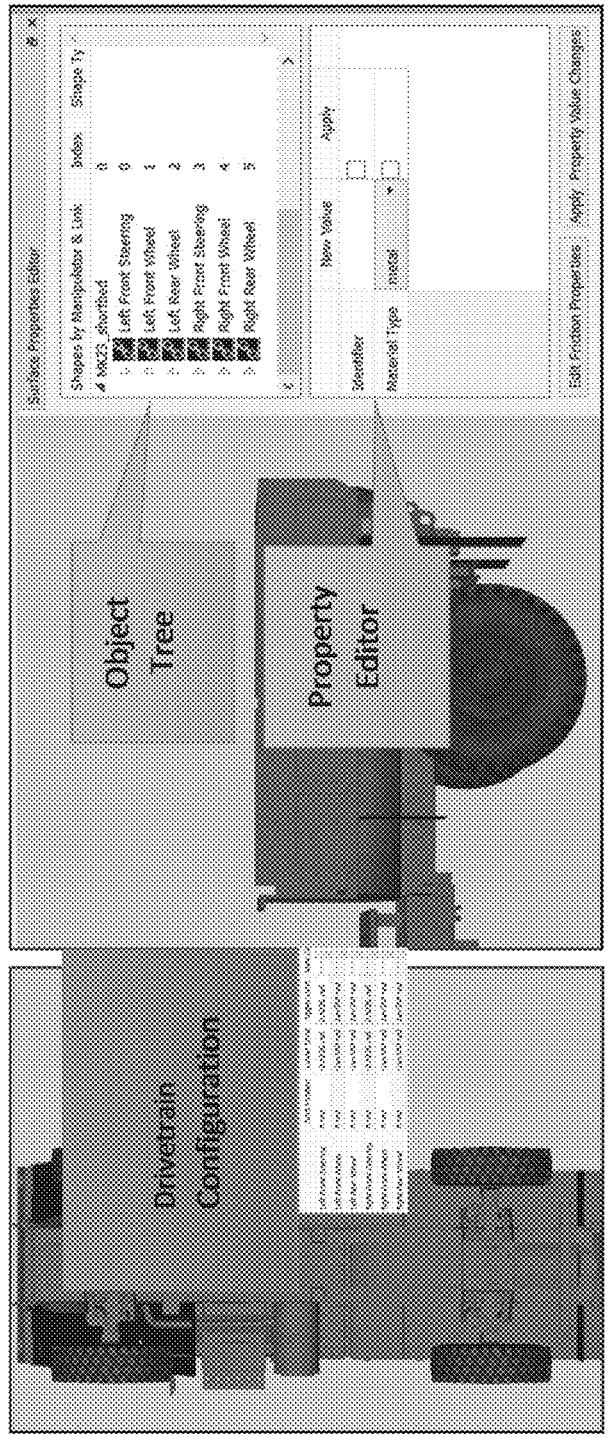
FIG. 25 is an example diagram consistent with the VA process according to one or more example implementations of the disclosure.
Figure 26:
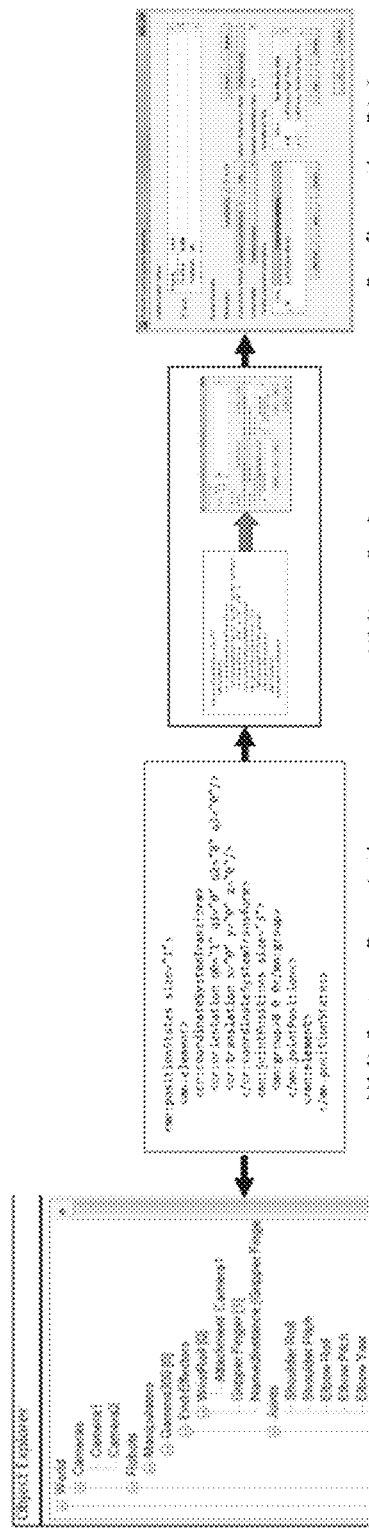
FIG. 26 is an example diagram consistent with the VA process according to one or more example implementations of the disclosure.
Figure 27:
FIG. 27 is an example diagram consistent with the VA process according to one or more example implementations of the disclosure.

In some implementations, this concept may be combined with the randomizing-optimizing shown in FIG. 4 to give the example multi-optimization architecture 2400 shown in FIG. 24. Note that the starting architecture shown in FIG. 4 is one possible configuration of this more general architecture, found by using P=1 components. Multi-optimization may find a compromise between competing goals. It may accommodate the ability of an agent (either human or algorithm) in the environment to adapt and change. With this example architecture 2400 of VA process 10, each metric may be optimized given knowledge of optimal strategy found for the other metrics. In some implementations, there may be no natural order in sequencing the optimization components, and the execution 302 may be controlled by a dedicated software module called the Sequencer, as shown in FIG. 24. In some implementations, a simple sequencer may walk through the components, while a more sophisticated algorithm may select components with the maximum change effect. The sequencer of VA process 10 may share the same simulation and state across the randomizing-optimizing components, but may change the optimization algorithms used by the components.

In some implementations, it may be established by combining the randomizing-optimizer from FIG. 4 with the application of multiple optimization criteria. The Sequencer and Compiler may manage execution of the components and compilation of the results. Each optimization component may be a full randomizing-optimizer as illustrated through the expansion of Component 1 of FIG. 24. Similarly, the Compiler shown in FIG. 24 may use the results of the optimizations to formulate a comprehensive result. In some implementations, a compiler may give the last result, and a sophisticated algorithm may integrate multiple results, which may be important when the optimization domain is shared and there is not a single value of convergence. When the optimization domain is shared, there may be no guarantee of equilibrium, and mean or bounds on optimization results from the sequenced components may contribute to the final results.

In some implementations, the above-noted vehicle builder tool of VA process 10 may be extended to allow specification and configuration of drivetrain components, sensors, dynamic simulation properties, environmental parameters such as day/night, and vehicle controllers. The above-noted convoy scenario builder tool may be extended to allow full configuration of the simulation and randomizing-optimizer including setting the validity conditions and variable randomizers and setting convoy behavior such as splitting and merging.

In some implementations, VA process 10 may include a set of interface classes with multiple specialized implementations of each. The following table provides a non-limiting example list of the interfaces and specializations.

TABLE 1

Interface classes and specializations.

| Interface Class | Description | Example Implementations |
| --- | --- | --- |
| EcInputVariableMapElement | Interface for setting input variables in the randomizing-optimizer | EcDrivingStyleInputVariableMap EcFrictionInputVariableMap |
| EcOutputVariableMapElement | Interface for setting output variables from the randomizing-optimizer | EcDistanceOutputVariableMap EcStateOutputVariableMap EcTimeOutputVariableMap |
| EcBaseVariableRandomizer | Interface for variable randomizers called by each instance of the randomizing-optimizer | EcMassRandomizer EcPayloadMassRandomizer EcSuspensionPropertiesRandomizer |
| EcBaseValidityCondition | Conditions used to change the state of the randomizing-optimizer during a simulation study | EcStabilityCondition |
| EcBaseVehicleController | Individual vehicle controller interface | EcVehicleControl EcHumanDriver |
| EcDrivetrainComponent | Individual drive train component interface | EcWheel EcDifferential |
| EcScalarMultivariableOptimizer | Optimization algorithm interface | EcMultidirectionalSearchOptimizer EcNelderMeadOptimizer |

In some implementations, the graphical user interface(s) of VA process 10 may build on the object tree to provide intuitive means of configuring the simulation. An example GUI element may include a custom dialog for loading and selecting the optimization algorithm, variable randomizers, vehicle controllers, convoy controller, and variable validation conditions. To aid in performance evaluation of the randomizing-optimizer, a new iteration statistic plotting view may be added to show the progress of the optimizer toward extrema. The iteration statistics plotted may include the objective metric value, output parameter values and user defined simulation parameters such as average vehicle speed and mean convoy separation distance.

In some implementations, the vehicle, the convoy, the environment (e.g., terrain and environmental objects), and randomizing-optimizer may be represented in an XML tree that may contain a significant number of parameters that may be changed by manually editing the XML. In some implementations, to improve usability, VA process 10 may include a user interface to graphically modify these objects through an object tree and property editor 2500, as shown in example FIG. 25. The object tree may provide drag-and-drop functionality to allow easy addition of new objects and rearrangement or removal of current objects. For example, the user (e.g., via VA process 10) may drag and drop a vehicle into a convoy, then drag and drop a sensor onto the vehicle. The interface may have a search feature for finding components by type or name. Sets of objects may be selectable at once using, e.g., the control and shift keyboard modifiers. Once a group of objects is selected, the common set of properties (e.g., sensor suite, control system, and parameters for dynamic simulation) may be displayed for individual or simultaneous modification.

In some implementations, the object tree may be coupled with automatic property editor dialog generation. When an object in the tree is selected, the property editor dialog may be opened, allowing the user (e.g., via VA process 10) to edit the parameters of this object. In some implementations, this may involve a C++ decorator pattern used to derive an XML property editor GUI class from each XML object, giving the property editor GUI a direct path to modify the XML member variables of the object.

In some implementations the sensor configuration tool may be extended to allow user configuration (e.g., via VA process 10) of some or all sensor parameters and expanded to include vehicle controller and drivetrain configuration. It may include the ability to load libraries of new sensors, controllers, and drivetrain components at runtime. To configure the vehicle, the user (e.g., via VA process 10) may simply "right click on (or otherwise select) the rendered model and edit the object through, e.g., a pop-up context menu. The vehicle configuration changes may be synched with the above-noted object tree, giving multiple paths to modify a vehicle's configuration. A GUI-based configuration system for the vehicle and convoy controls may also be developed.

In some implementations, user interface components of VA process 10 may be implemented to adapt to newly defined components. In some implementations, user interface elements may be built using Qt. To allow an extensible interface system, an XML to Qt converter 2600 shown in FIG. 26 may translate the XML configuration of the system into a user-friendly dialog box. This may give the user the ability to easily alter any component of the framework.

In some implementations, VA process 10 may include the ability to load general GIS terrain databases including the GeoTIFF (.tif, .tiff) format into the convoy simulation environment. VA process 10 may leverage osgEarth and Virtual Planet Builder tools (or others), which are based on the open source toolkit OpenSceneGraph, for terrain tile creation and paging. The height field data of terrain tiles in contact with each vehicle may be paged into memory and used to calculate collision forces at a speed compatible with the needs of Monte Carlo simulation, which is shown by example in example terrain GIS database loading 2700 in FIG. 27. In some implementations, the ability to store and modify surface properties (e.g., friction, surface tension, damping constant) on paged terrain tiles may be included.

Figure 28:
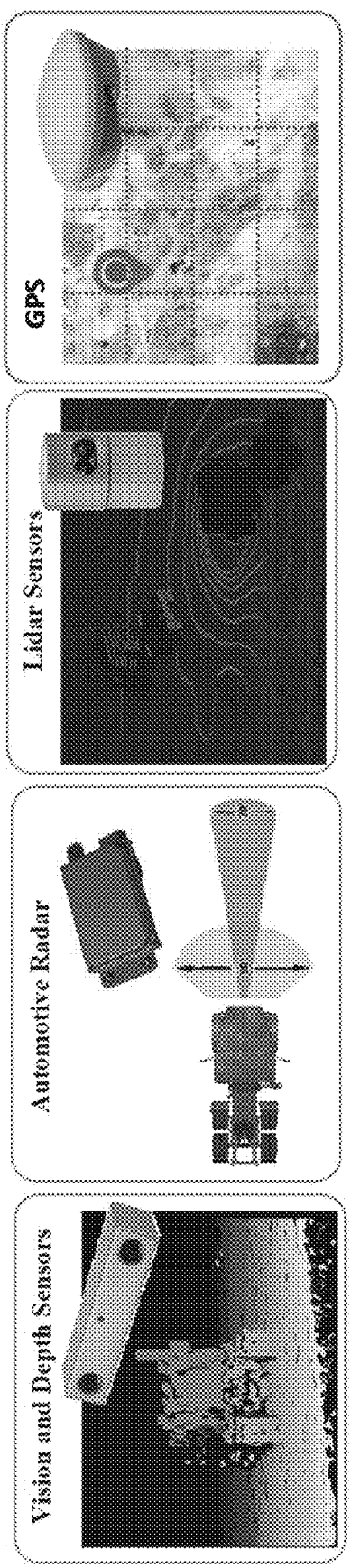
FIG. 28 is an example diagram consistent with the VA process according to one or more example implementations of the disclosure.
Figure 29:
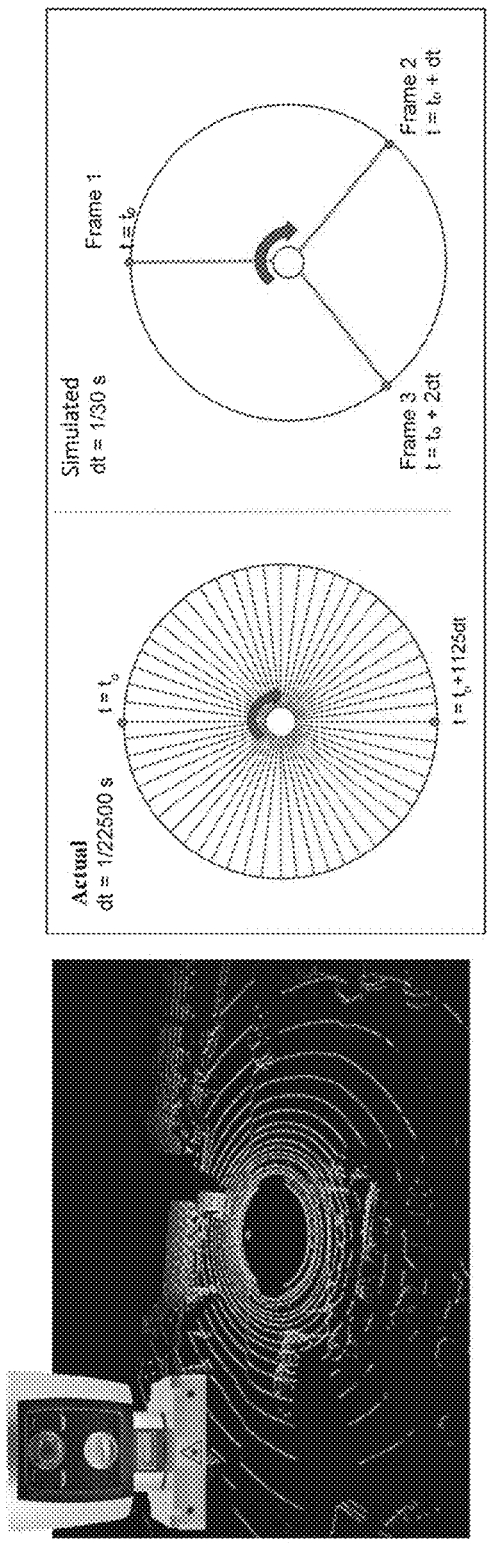
FIG. 29 is an example diagram consistent with the VA process according to one or more example implementations of the disclosure.

In some implementations, VA process 10 may fully implement a suite of example sensors, including LIDAR, Automotive Radar, Stereo Cameras and GPS, shown in FIG. 28. In some implementations, VA process 10 may include physics-based enhanced surface rendering using multi-texture mapping. This may improve diffuse texture mapping for geometry in the simulation, where a color image may be mapped to the vertices of the geometry mesh defined by texture coordinates. The visual realism of a surface may be greatly enhanced by adding normal and specular maps to complement the diffuse map. Normal maps may be used by VA process 10 to modify the normal vectors of a surface and give the appearance of fine topological detail without adding vertices. Specular maps may provide fine control over the specular reflection or shininess of the surface. When combined, these may improve the surface detail and realism of rendered objects. In some implementations, VA process 10 may include the ability to apply all three texture maps to surfaces.

In some implementations, VA process 10 may include a next-generation GPU-optimized radar sensor simulator that may be created using the OpenGL shading language and incorporated into, e.g., the OpenSceneGraph rendering engine of VA process 10. In some implementations, each radar sensor simulator may leverage the rendering engine to generate a depth map of the simulated scene from the point of view of the sensor, taking into account, e.g., the sensor resolution, field of view and range. A noise model may account for the surface property dependence of the radar sensor returns. The radar simulator may run in real-time through, e.g., a GLSL shader that may capture the depth image, perturbs the depth values based on the surface properties of the target object stored in a vertex mapped texture. The simulator (e.g., via VA process 10) may return a list of targets including, e.g., range, velocity and size for each.

In some implementations, VA process 10 may include a graphics hardware accelerated 3D LIDAR simulator. It may model, e.g., the high fidelity Velodyne HDL-64E LIDAR sensor, or other LIDAR sensor. This LIDAR unit may have 64 lasers mounted vertically on a rotating head. The LIDAR head may rotate at 5 to 15 Hz providing 1.3M points per second in the range of 1 to 100 meters with 360 degree horizontal by 26.8 degree vertical field of view. To simulate each 360 degree scan, and referring at least to FIG. 29, a set of N OpenGL render views 2900 may be oriented every 360/N degrees about the sensor's axis of rotation by VA process 10 and the scan distances may be calculated from the rendered depth buffer from each view. For six render cameras, this may equate to each rendering having a 60 degree horizontal field of view and returning depths for 53 scan azimuths. To capture higher speed motion more render views may be required. Data may be published to subscribers in scan segments containing six azimuth angles each, with a total of 159 scan segments per 360 degree scan.

In some implementations, the non-linear scan pattern of the HDL-64E may be taken into account. The linear OpenGL view projection may be distorted based on mapping the scan azimuth ($\theta$) and elevation ($\varphi$) to depth image pixel space using spherical projection of the laser rays onto the image plane. The mapping between scan azimuth and elevation to image pixel space [u, v] may be given by the following equations:

$$r = \begin{bmatrix} r_x \\ r_y \\ r_z \end{bmatrix} = \begin{bmatrix} \sin\varphi \cos\theta \\ \sin\varphi \sin\theta \\ \cos\varphi \end{bmatrix} \quad (5)$$

$$u = \frac{r_x(\varphi,\theta) - r_x(\varphi_{min},\theta_{min})}{r_x(\varphi_{max},\theta_{max}) - r_x(\varphi_{min},\theta_{min})}(u_{max}), \quad (6)$$

$$v = \frac{r_z(\varphi,\theta) - r_z(\varphi_{min},\theta_{min})}{r_z(\varphi_{max},\theta_{max}) - r_z(\varphi_{min},\theta_{min})}(v_{max})$$

The 3D LIDAR simulation may be optimized to run on graphics hardware using the OpenGL shading language (GLSL). The first optimization may be to render the LIDAR views with multithreaded render camera objects and enable OpenGL context sharing. In this way, the LIDAR view may be rendered using a graphics context that is shared with all other views of the scene graph, which may decrease the memory footprint and eliminate latency from graphics context switching. This may be implemented in a GLSL shader to further improve runtime performance.

In some implementations, VA process 10 may include a GPS sensor simulator that may be based on converting the projected coordinates, Universal Transverse Mercator (UTM), of imported GeoTiff terrain files to geographic coordinates of latitude ($\varphi$) and longitude ($\lambda$). The sensor simulator may publish the latitude and longitude as well as the GPS based velocity estimate. The GPS reading may be perturbed by a noise model that may include, e.g., a user defined offset, Gaussian noise, and low frequency drift. The coordinate system origin of the simulation may be defined by a fixed point in the UTM zone.

Figure 30:
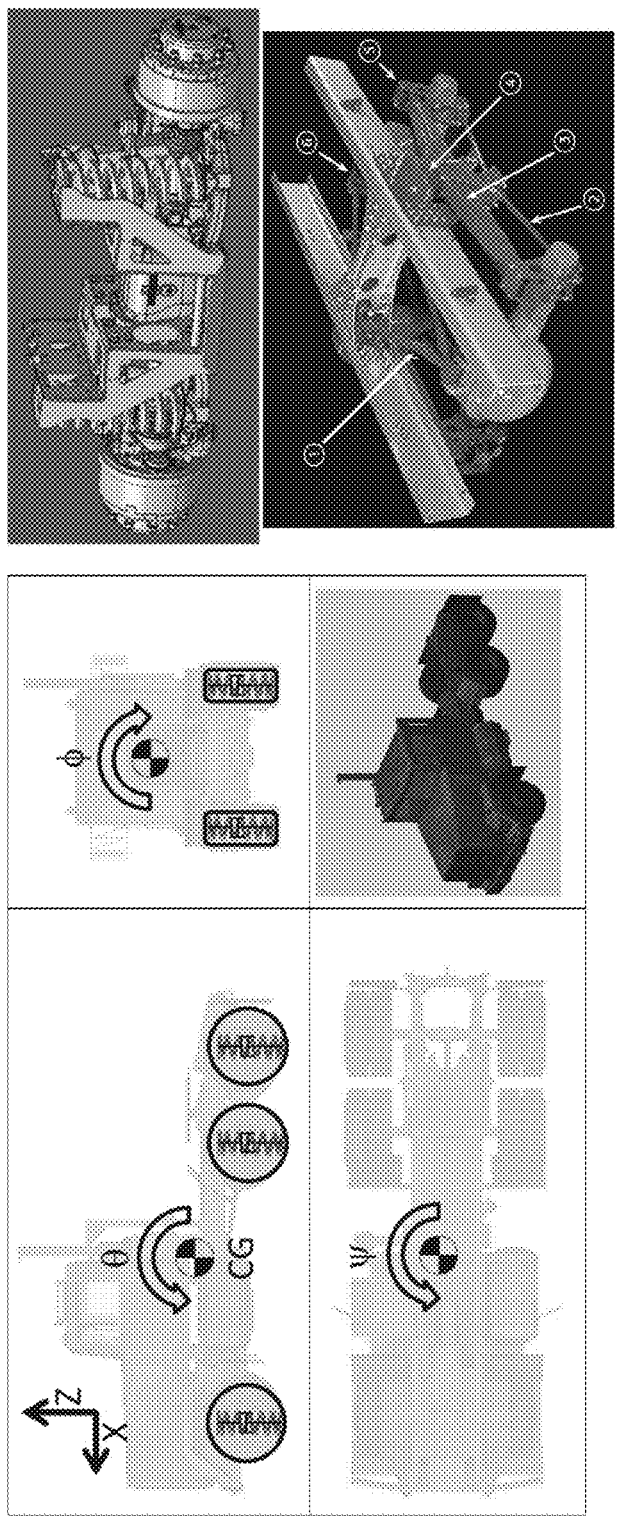
FIG. 30 is an example diagram consistent with the VA process according to one or more example implementations of the disclosure.

In some implementations, the suspension model may have three degrees of freedom for the sprung mass of the vehicle body and the vertical stiffness of each unsprung wheel. VA process 10 may focus on the vehicle body degrees of freedom roll ($\phi$), pitch ($\theta$), and bounce. In some implementations, VA process 10 may optionally assume that yaw ($\psi$) dynamics due to suspension are negligible. In some implementations, VA process 10 may combine the wheel stiffness with the suspension spring-damper models or may be modeled separately. The example AMK23 has six independent suspensions modeled with independent spring-dampers, as is shown by example in example FIG. 30. FIG. 30 shows an illustration of suspension dynamics (left) and AMK23 TAK-4 independent suspension (top-right) and Sterling TufTrac (lower-right). 1: V-Rods, 2: Fore-Aft Torque Rods, 3: Parabolic Taper-Leaf Springs, 4: Center Pivot, 5: Spring Isolators, 6: Control Rod Joints. In some implementations, VA process 10 may have an upgraded M915 to model the dynamics of the TufTrac, which may introduce dependent suspensions. TufTrac may couple the dynamics of adjacent rear wheels. For example, if the far rear left wheel encounters a bump, the resulting bounce may increase the spring force on two wheels: 1) the adjacent forward wheel through the leaf springs, and 2) the adjacent right wheel through the axle and V-rods. This is intended to produce even loading on the four rear wheels.

Figure 31:
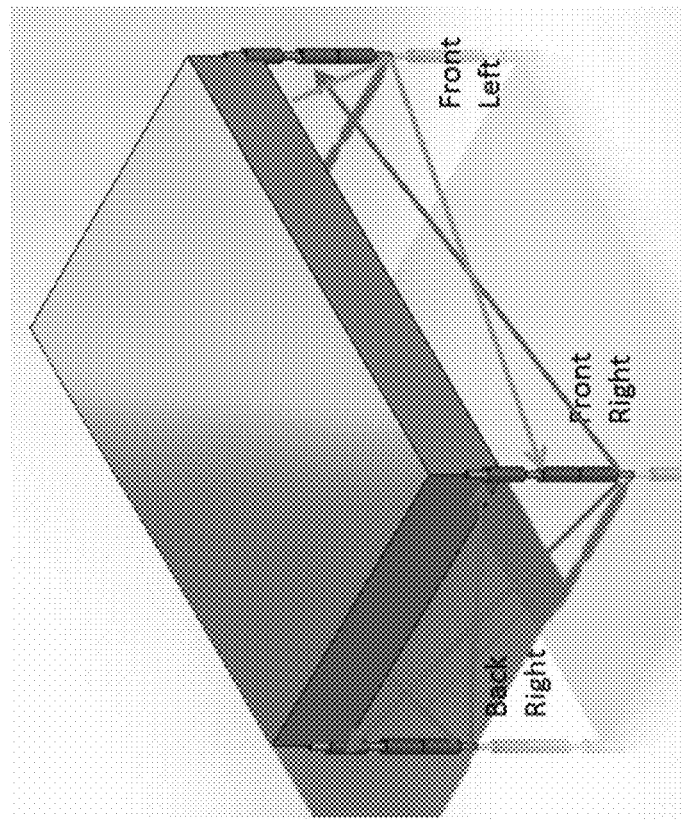
FIG. 31 is an example diagram consistent with the VA process according to one or more example implementations of the disclosure.
Figure 31:
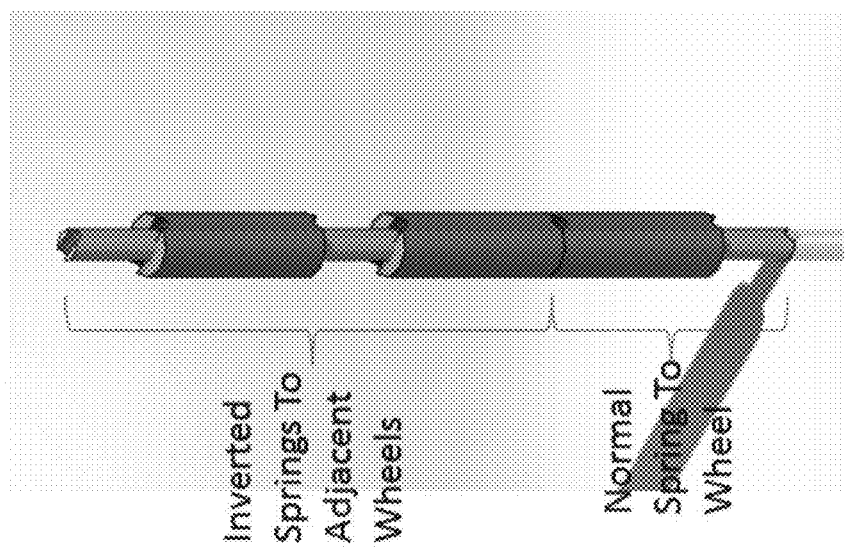

In some implementations, and referring at least to FIG. 31, an example TufTrac suspension model concept 3100 in SolidWorks is shown that may be incorporated into the M915 model for leveling the load across the four rear wheels. In this example design, each wheel has three spring-dampers. The bottom one is independent. The top two are constrained to a spring on an adjacent wheel. VA process 10 may establish proper suspension damping and stiffness parameters through the validation effort.

In some implementations, VA process may include a more detailed model for engine dynamics. For example, if the target is a digital control, then relatively low order models in discrete time and quasi-linear may be desired. VA process 10 may include design models of two inputs and two outputs with transfer functions of first order and second order with delay. In some implementations, VA process 10 may model the internal combustion engines with independent transfer functions according to the following matrix:

$$Y(s) = \begin{bmatrix} \dfrac{K_{11}e^{-\tau_1 s}}{\tau_a s + 1} & \dfrac{K_{12}e^{-\tau_2 s}}{\tau_b s + 1} \\ \dfrac{K_{21}e^{-\tau_3 s}}{\tau_c s + 1} & \dfrac{K_{22}}{\tau_d s + 1} \end{bmatrix} \cdot U(s), \quad (7)$$

$$\text{with } Y(s) = \begin{bmatrix} \text{Rpm(s)} \\ \text{Torque(s)} \end{bmatrix}, U(s) = \begin{bmatrix} \%\text{Opening(s)} \\ \%\text{Brake(s)} \end{bmatrix}$$

Where $K_{ij}$ are the system gains, $\tau_i$ the system delay in seconds and $\tau_i$, $\tau_b$, $\tau_c$, $\tau_d$ are the time constants of the drivetrain subsystems. VA process 10 inputs may be, e.g., the percentage of throttle opening (% Opening(s)) and the duty cycle of the PWM of the magnetic brake (% Brake(s)), and the outputs are the engine speed (Rpm(s)) and torque (Torque(s)). In addition to a more detailed engine model, additional types of drivetrain components may be included in VA process 10, such as, e.g., transmissions (such as the Allison HD4000 series found in M915 family of vehicles), as well as additional types of differentials.

Figure 32:
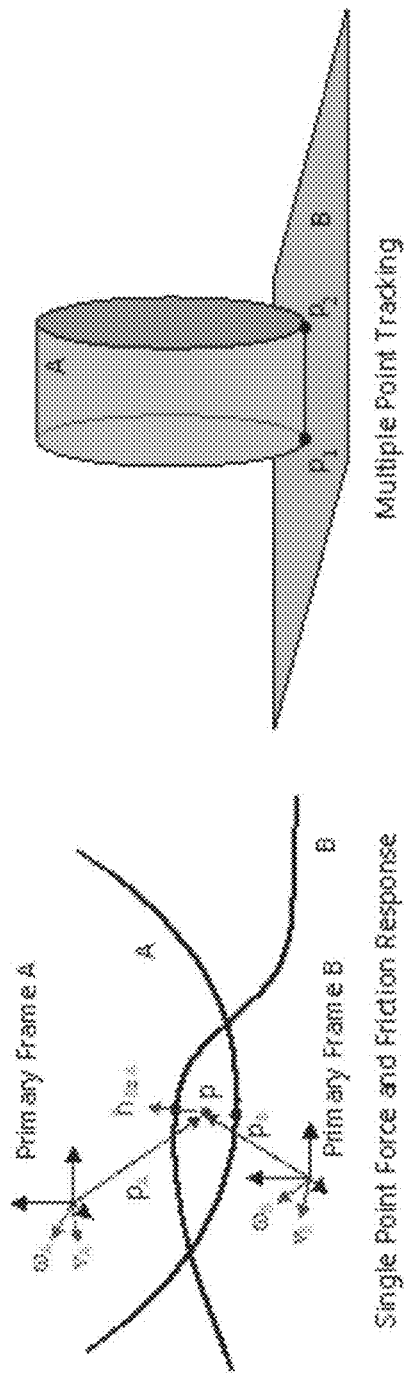
FIG. 32 is an example diagram consistent with the VA process according to one or more example implementations of the disclosure.
Figure 33:
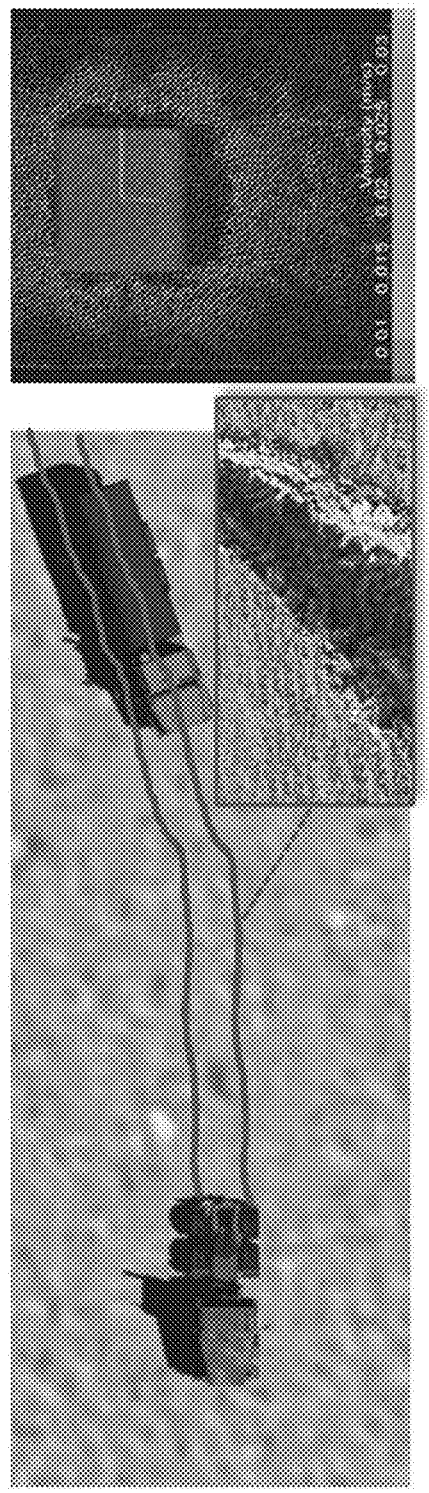
FIG. 33 is an example diagram consistent with the VA process according to one or more example implementations of the disclosure.

In some implementations, VA process 10 may extend a single-point contract model for fast simulation with rigid terrain surfaces to include multiple points to implement a quasi-rigid contact model 3200 for wheel interaction, as shown in example FIG. 32. In the example rigid model, for each point, the force response may be a function of, e.g., position, velocity, and breaking-spring state of the two bodies. This may be extended to multiple points or nodes in a quasi-rigid model. With rigid terrains, the single-node model for contact response and friction modeling, shown on the left, may be extended to a multipoint quasi-rigid model as shown captured for two nodes on a cylinder impacting a plane on the right. To find the multiple nodes used to model the contact surface, VA process 10 may combine the use of regional discretization (e.g., breaking up one 3D shape into several) and collection of closest points over a time window with clustering and persistence rules. VA process 10 may collect a representative set of points sampling the contact. With the quasi-rigid model, the inertia of the contacting bodies may remain constant, but the contact surface may change.

Figure 34:
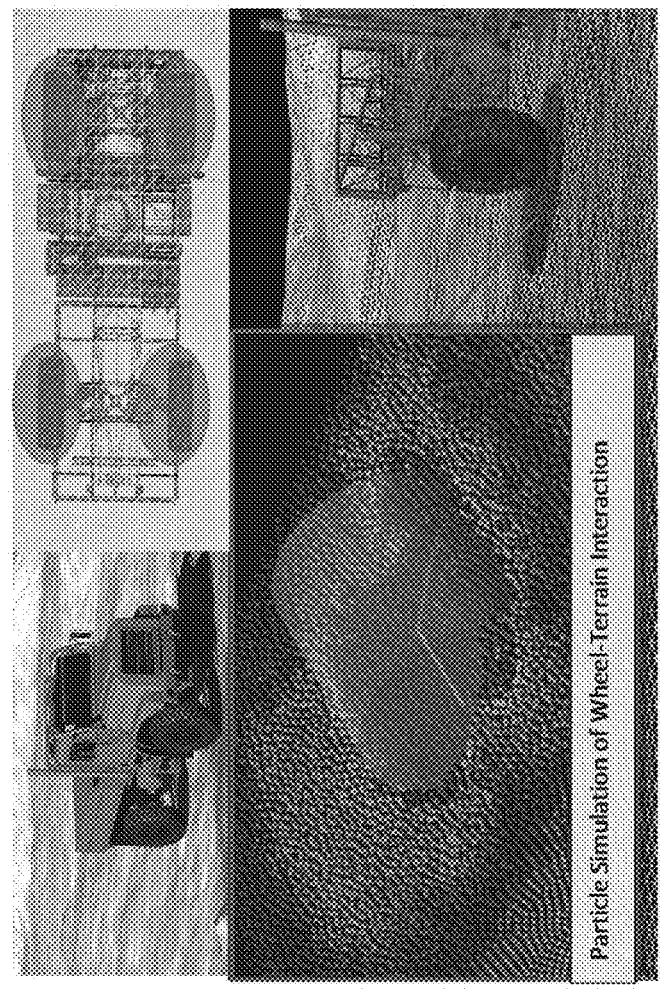
FIG. 34 is an example diagram consistent with the VA process according to one or more example implementations of the disclosure.
Figure 34:
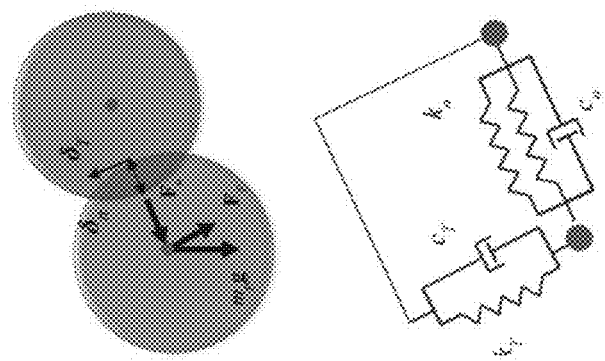
Figure 35:
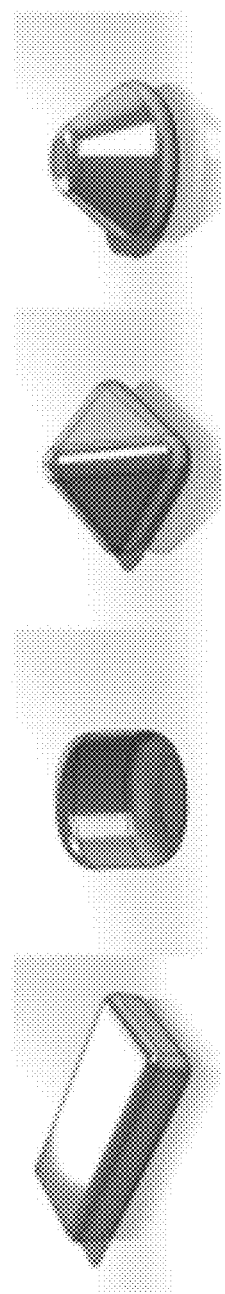
FIG. 35 is an example diagram consistent with the VA process according to one or more example implementations of the disclosure.
Figure 36:
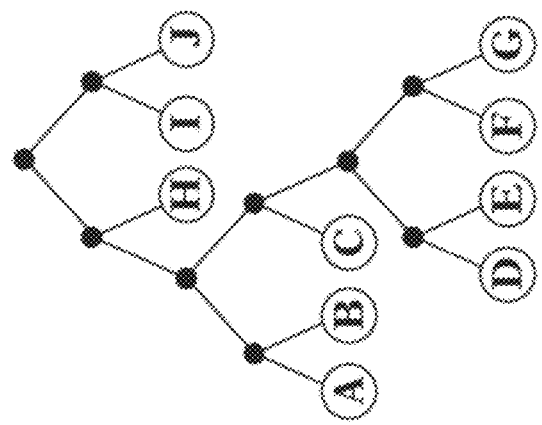
FIG. 36 is an example diagram consistent with the VA process according to one or more example implementations of the disclosure.
Figure 36:
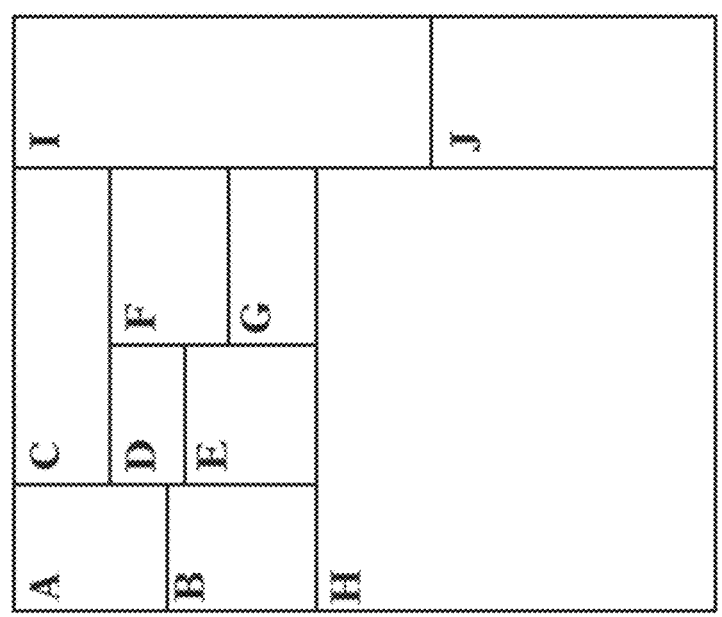
Figure 37:
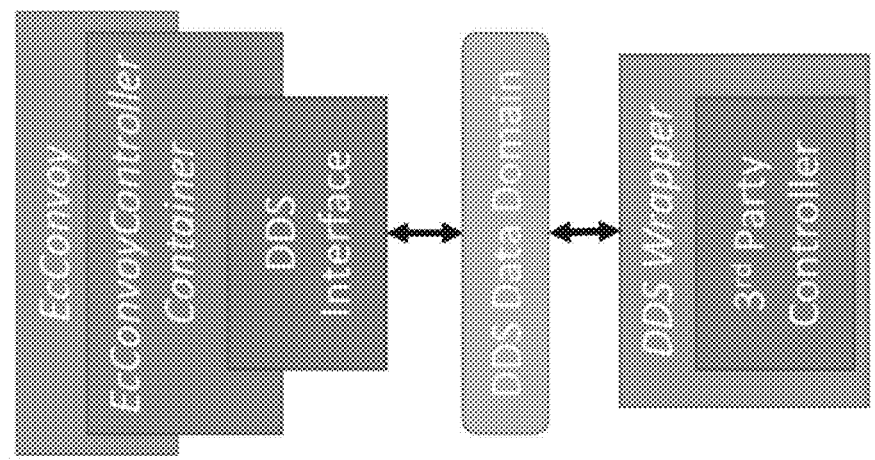
FIG. 37 is an example diagram consistent with the VA process according to one or more example implementations of the disclosure.
Figure 37:
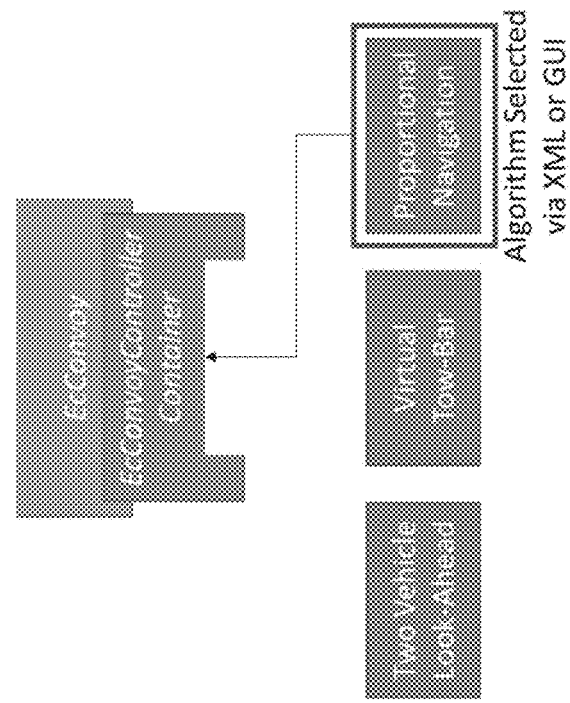

In some implementations, to simulate complex but important terrain-wheel interactions such as sinkage, slippage, and terrain deformation, VA process 10 may include a particle model that may complement the quasi-rigid model discussed above. This may also model terrain deformation 3300 as shown in example FIG. 33. Particle methods including Discreet Element Method (DEM) and Smoothed Particle Hydrodynamics (SPH) may be robust at modeling plastic deformation in soil mechanics, and may be used by VA process 10. Referring at least to FIG. 34, the particle contact dynamics may be based on the non-linear Hertz-Mindlin granular contact model 3400 to account for properties of soil particles including the Young's modulus, shear modulus, Poisson ratio, and the coefficient of restitution. The contact force may be calculated as:

$$F = F_n + F_T = (k_n \delta_n - c_n v_n) + (k_T \delta_T - c_T v_T) \tag{8}$$

The spring constants and damping coefficients in the contact normal and tangential directions may be derived according the Hertz-Mindlin model. Estimates for the soil DEM particle properties may be used. To simulate the formation of ruts in soil, three rotational degrees of freedom may be included in the particle model. 3D rotation may provide higher fidelity through inclusion of rolling and torsional friction, which may translate to more realistic macro properties such as particle heaping, friction angles and granular flow.

In some implementations, VA process 10 may include a bond element model for brittle cohesive soil types including, e.g., clays and cemented sands. The bond element may be essentially a link between particles that resists shear ($F_s$), torsion ($T_T$), bending ($T_b$), tension and compression ($F_n$). This bond model may allow the terrain surface to maintain form under stresses applied by a vehicle wheel until the critical stress is reached, providing a realistic breakup of the soil and rut formation.

In some implementations, to reduce the number of particles needed, the sliding particle domain shown in FIG. 34 may be used. The particle system may be modeled as an interacting body that moves relative to the vehicle's base. As the vehicle moves, the base motion may be applied directly to the particle system. The terrain mesh may be dynamically modified to match the particle bed surface profile as the vehicle drives over the mesh. This may allow each vehicle to make ruts, which may then be seen by the vehicles following.

In some implementations, multiple particle-packing strategies may be used to convert the terrain mesh entering the interaction zone, effectively recycling the portion of particle bed that exited. VA process 10 may accomplish this recycling of particles without memory allocation and preventing non-physical perturbations to the particle bed at the boundaries. The shear and normal stress profiles in the particle bed may be used as the heuristic to define the depth of the zone of influence beneath the vehicle. A metric based on the velocity distribution of particles may be used by VA process 10 to set the radius of the volume given the speed of the vehicle. FIG. 31 shows the volume of influence around the vehicle where the mesh may be converted into a particle system with radius R and depth d. The non-linear contact model for soil simulation (left) and a set of sliding particle domains (shown as ellipses above) may be implemented to simulate terrain interaction around the vehicle's wheels in large terrains.

In some implementations, VA process 10 may optimize link shapes stored as polygon meshes for collision detection by enclosing them in object bounding volumes. Desirable properties for bounding volumes may include, e.g., inexpensive intersection tests, tight fitting, inexpensive to compute, easy to rotate and transform, and efficient storage. In some implementations, VA process 10 may use additional bounding volume shapes to enable a higher level of fidelity in collision detection for vehicle systems. These new shapes 3500 (e.g., Box-lozenge, cylinder-lozenge, tetrahedral lozenge, and conical lozenge) are shown in example FIG. 35, and may be used to speed calculation on self-contact and environmental contact.

In some implementations, bounding volume shapes may be parametric. For example, a sphere may be specified by its center and radius. Users (e.g., via VA process 10) may use two GUI draggers to specify a sphere. A capsule may be specified by a line segment and radius. Users (e.g., via VA process 10) may use three draggers to specify a capsule. Similarly, all shape primitives may be specified using a minimum set of draggers. In some implementations, VA process 10 may include a shape primitive plugin to provide information to the user such as completeness, e.g., whether the bounding volumes fully bound the link, and tightness, e.g., the largest distance between the polygon physical extent and its bounding volumes. VA process 10 may finish the bounding volume generation for tetrahedron, cylinder, cone, and lozenges using the principle axes and iterative refinement methods similar to the approach for capsules, circular and triangular-lozenges.

In some implementations, VA process 10 may check the axis-aligned bounding boxes (AABBs) of two shapes before checking collision of the two shapes to speed up collision detection. If the AABBs do not intersect, then checking collision between the two shapes may not be necessary. However, the AABB checking may only be done at the link level. If the shape of a link is a shape union and needs to be checked for collision, all shape primitives in the shape union may be checked. In some implementations, VA process 10 may extend the AABB checking deeper into the shape union level for simple shape unions (e.g., with a small number of shape primitives). For a shape union with a large number of shape primitives, since the relative positions of those shape primitives are fixed, it may be possible to construct spatial partitions such as octrees or k-d trees 3600 shown in example FIG. 33. A 2D k-d tree is shown on the left, with the spatial decomposition. On the right is shown the k-d tree layout. In the example, only shapes sharing the same region may be checked for collision.

In some implementations, as vehicle speeds are increased, the drag force due to wind resistance ($F_d$) may increase according to the relation below $$F_d = \tfrac{1}{2} \rho v^2 C_D A \qquad (9)$$

where σ is the density of the air, is the magnitude of the forward velocity, $C_D$ is the drag coefficient and A is the wetted area (the area of the vehicle projected onto a plane normal to the direction of v). Here, both the coefficient of drag and the wetted area may depend on the angle of the velocity relative to the axes of the vehicle. For example, a vehicle navigating a turn may exhibit a different value for these components when compared to a vehicle traveling straight. To account for this, the drag model of VA process 10 may be implemented as a lookup table, with the relative wind angle being used to lookup the product of $C_D A$. The vehicle speed and ambient conditions may then be used to calculate the drag force. This approach may yield an accurate result, without requiring significant computational overhead (such as may be associated with a computational fluid-dynamics approach). As the lookup tables may vary from vehicle to vehicle, they may be stored as a part of each vehicle model.

In some implementations, an overall control architecture was developed that divided the problem of convoy control into one or more parts: the high level control of the convoy, which may determine where each vehicle should be positioned given the location of all other vehicles, and vehicle control, which may determine what the control inputs should be set to in order to move a single vehicle to its desired position. Thus, for a twelve vehicle convoy, there would be one convoy controller, and twelve individual vehicle controllers. In some implementations, VA process 10 may provide two pathways that may enable third-party algorithms to be used within the stochastic optimizing framework. For example, the first, and possibly most direct method may be to compile the algorithm into a dynamically linked library (DLL), in a class that inherits from EcVehicleController or EcConvoyController. This library may then be selectable at runtime via either XML or the graphical user interface. This example approach 3700 is shown in example FIG. 37 on the left. As previously discussed, this ability may grant a large amount of flexibility to the system, and allow changes to be made to individual components without requiring recompilation of the entire codebase. On the left, XML, and GUI-based algorithm selection is shown. Here, three control algorithms may fit the interface defined in EcConvoyControllerContainer, proportional navigation may be selected and used at runtime. On the right, integration of third party control algorithms may be enabled via the use of the Data Distribution Service (DDS) protocol. Here, a wrapper class around the third-party algorithm may be used in conjunction with a DDS interface class within VA process 10 to enable use of the algorithm without exposing it to the end user. This protocol may enable information (e.g., simulated sensor results and control actions) to be transferred between these "black box" algorithms and the simulation environment of VA process 10. In some implementations, this approach may enable VA process 10 to perform bench tests and other hardware-in-the-loop testing, since the simulated sensor results may be used to drive physical actuators.

Figure 38:
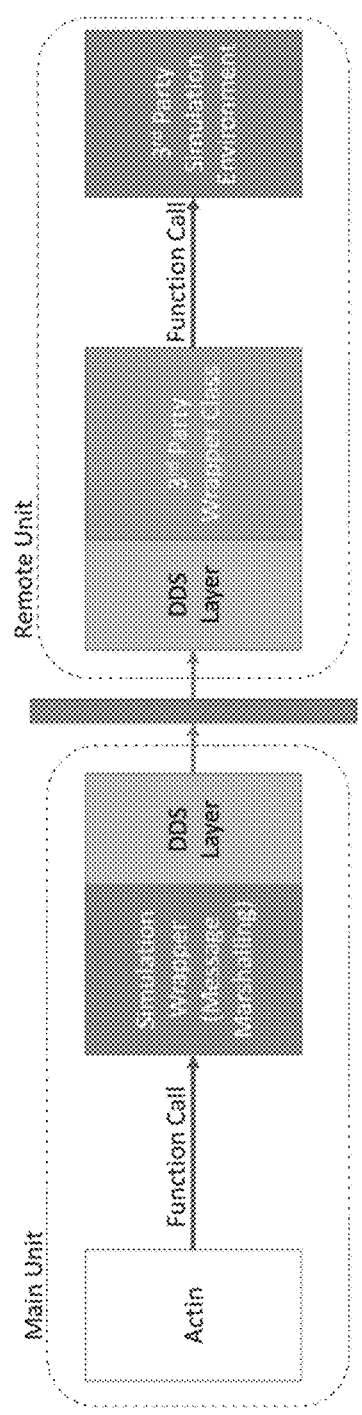
FIG. 38 is an example diagram consistent with the VA process according to one or more example implementations of the disclosure.

In some implementations, VA process 10 may include a fully functional simulation system that may include both dynamic and kinematic simulation, which may include, e.g., joint friction, actuator simulation, collision detection, and impact dynamics. Example simulation environments that may be used with VA process 10 may include, e.g., ANVEL, Chrono, and TruckSim. VA process 10 may include the capability to integrate the multi-optimization framework with other simulation environments. This capability may utilize the Data Distribution Service (DDS) protocol to pass information between the main software instance and the remote simulation environment 3800, as shown in example FIG. 38. As shown in FIG. 38, the simulation environment is replaced with 3rd part system using DDS. This publisher/subscriber-based system may be cross platform, allowing easy integration of the multi-optimization framework and the new simulation environment, regardless of the operating systems involved.

In some implementations, users (e.g., via VA process 10) may develop a wrapper class that may translate DDS messages published by VA process 10 into a form that can be utilized in the new simulation environment. This class may also translate the calculated state of the simulation into a form understandable by VA process 10.

In some implementations, VA process 10 may enable users to replace or augment individual algorithms within the simulation environment. For example, a user may wish to utilize a new tire traction model to simulation road/tire interaction, or an alternative method of modelling the forces produced by the drivetrain. The replacement or addition of a given algorithm may be accomplished in a manner similar to that used to integrate new control algorithms described above. For example, first, the user (e.g., via VA process 10) may compile the algorithm (derived from the appropriate base class) into a DLL, then select it for use in the simulation with the XML framework.

In some implementations, VA process 10 may identify model optimization problems for validation of the fully implemented randomizing-optimizer and multi-optimization architecture. In some implementations, problems may be designed or selected from the literature of sufficient complexity to exercise some or all components of the architecture, and may have an alternative solution method for comparison. Metrics may be developed to validate the implementation's rate of convergence, solution error, and computational resource utilization.

In some implementations, VA process 10 may use empirical data when available to validate the suspension and traction models. For suspension, the focus may be on the pitch and roll moments, and the vertical force. For traction, the focus may be on the lateral and longitudinal forces ($F_x$ and $F_y$) and the aligning moment ($M_z$) for each wheel. The example formula tire model used may be the one described by Pacejka and Bakker may be an empirical model to calculate these forces and moments for a wide range of weather conditions such as dry, wet, and icy road conditions.

Figure 39:
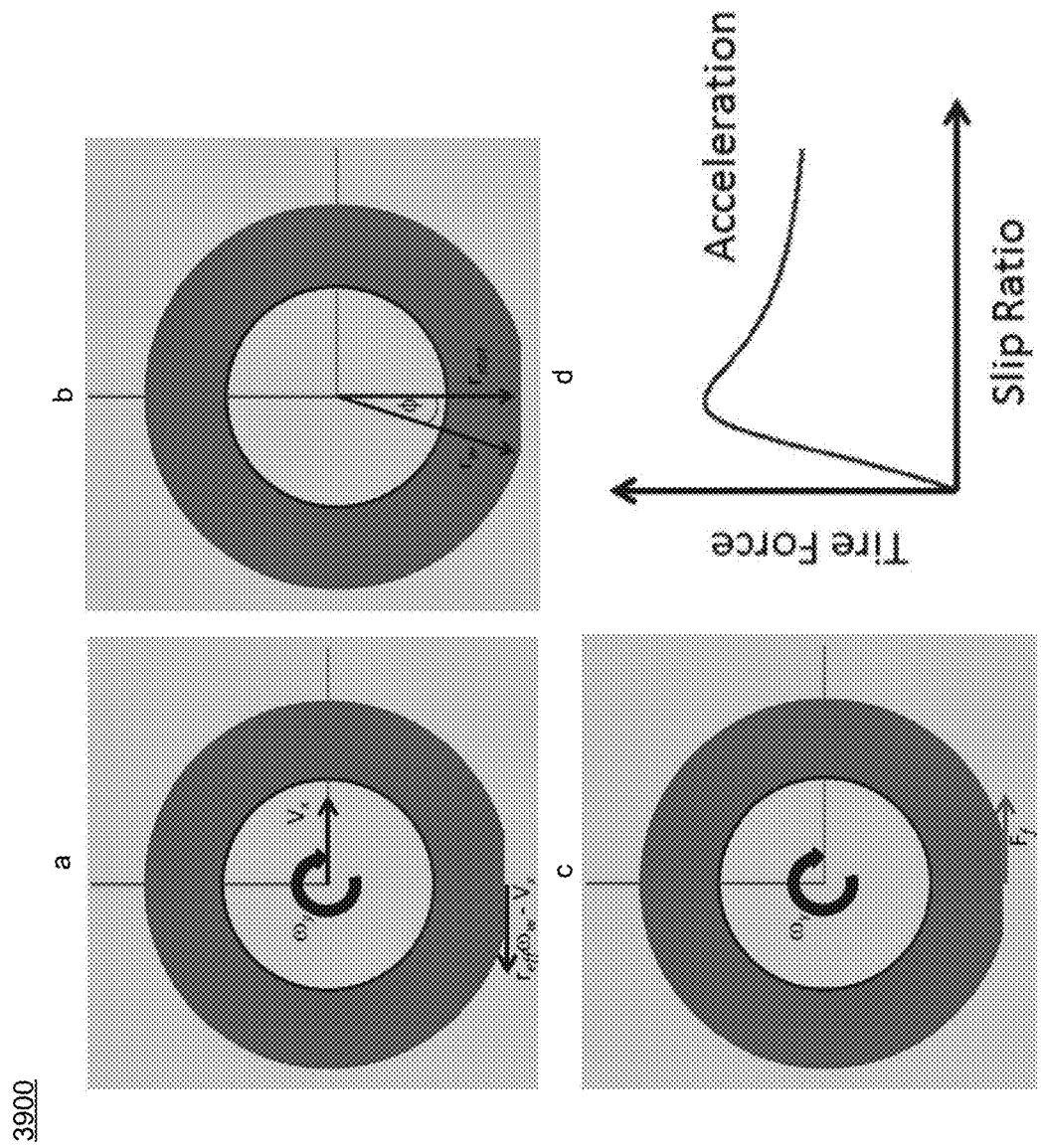
FIG. 39 is an example diagram consistent with the VA process according to one or more example implementations of the disclosure.

The primary inputs to the model may be slip angle and slip ratio. The slip angle may be the angle between the orientation of the wheel and the velocity of the wheel. The slip ratio of an accelerating wheel may be defined as follows:

$$\sigma_x = (r_{eff}\omega d - V_x)/V_x \quad (10)$$

where $r_{eff}$ is the effective radius defined as $(\sin(\phi)/\phi)*r_w$ or $(\tan(\phi)/\phi)*r_{stat}$ (shown in FIG. 39 with example parameters 3900) and cow is the rotation rate of the wheel and $V_x$ is the longitudinal velocity of the wheel. As the velocity approaches zero, this relation becomes infinite, which may require modifications to the formula to be made at low wheel speeds. FIG. 39 shows how the comparison between the simulation and the formula may work. The forces and motions are shown in (a). In (b), $r_{stat}$ is the distance to the flat patch at the bottom of the tire. (c) shows the friction or traction force. The curve in (d) shows a notional longitudinal tire force for a range of slip ratios during acceleration. The curve is configurable for a range of operating conditions such as icy and dry roads. At a given slip ratio, a traction force may be calculated and compared to the simulation. Through this effort, VA process 10 may tune the surface properties in the simulation to improve accuracy.

In some implementations, to validate the particle based terrain simulation VA process 10 may compare sinkage-pressure relationship of the simulated soil to widely accepted semi-empirical models. Sinkage may define how the vehicles wheels may sink into the soil given the soil properties, vehicle weight and area of contact. It may be estimated using the semi-empirical formula derived by Bekker for the sinkage-pressure relationship of static flat plates on loose soil:

$$p(h) = (k_c/b + k_\phi)h^n \quad (11)$$

where p(h) is the static pressure (stress) under a plate with sinkage h and width b. The remaining experimentally determined parameters n, $k_c$, and $k_\phi$ are the sinkage exponent and pressure sinkage modules respectively. The values of these parameters for loose soil were measured by several researchers. In some implementations, VA process 10 may include a simulation of the flat plate experiment to validate the particle simulation to compare values of n, $k_c$, and $k_\phi$ with those published for common soil types.

In some implementations, the radar and LIDAR simulators may be based on an OpenGL rasterization pipeline. This approach may provide a way to achieve real-time sensor simulation but may not necessarily reach the level of fidelity provided by ray-tracing. In some implementations, VA process 10 may include a ray tracing module to validate the radar and LIDAR simulators. The validation metric for the radar and LIDAR simulator may be based on the Euclidian distance from the rasterization generated scan point to the true ray-traced scan point.

In some implementations, a convoy may be led by a human driver who tries to maintain the convoy stability. There may be adversarial agents also present in the environment who intentionally or unintentionally want to achieve competing goals, such as an opponent vehicle who tries to disrupt the convoy or bad terrain and/or weather conditions that can interfere with control and sensor readings. In some implementations, VA process 10 may use the multi-optimization framework to find the best human control strategy while the adversarial agents attempt to achieve their best disruptive strategy. For example, VA process 10 may use the improved vehicle dynamics, traction and suspension models, terradynamics, sensor simulation, and integrated control algorithms to provide realistic simulation results.

These may be leveraged by the multi-optimization framework to provide results that, as closely as possible, may replicate real-world results. In some implementations, the simulation results may be tuned by VA process 10 to match sensor data, and the multi-optimization framework may be used by VA process 10 to seek out and reproduce the failure mode observed during testing.

Figure 40:
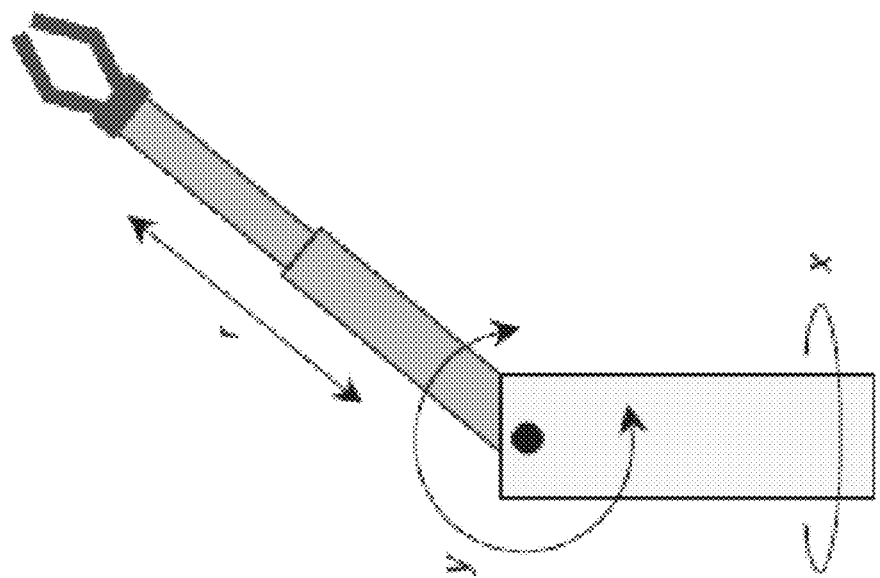
FIG. 40 is an example diagram consistent with the VA process according to one or more example implementations of the disclosure.

It will be appreciated that other various adaptations of the disclosure may be made without departing from the scope of the disclosure. For example, in some implementations, space may be one of the domains used in the stochastic simulation scenario, as well as one or more of a land vehicle, an air vehicle, and a water vehicle fixed base articulated robot arms and/or one or more mobile articulated robot arms mounted on at least one of the land vehicle, the air vehicle, and the water vehicle as a component of the simulation. An example articulated robotic arm 4000 is shown in example FIG. 40. For example, VA process 10 may be used with programs such as the Spacecraft for the Universal Modification of Orbits (SUMO) program to provide a robotic system for servicing and moving spacecraft, which may be autonomously attached to fixtures on many different types of target platforms and may include one or more robotic arms connected to a base including the payload module and the propulsion system. As another example, VA process 10 may be used for a robotic satellite servicing spacecraft. The spacecraft may employ grasping arms (e.g., via VA process 10) that may manipulate unique tools to reconfigure, e.g., orbiting satellite hardware. The arms may be designed to have many degrees of freedom. As yet another example, dynamic objects may be defined as objects within the scene that may be moved or manipulated by a rover system (e.g., with whole body mechanisms such as pushing, or via robotic arms). These objects may be placed as independent objects in the scene, separate from the terrain mesh. VA process 10 may enable simulations that enable them to freely move around the scene, based on realistic collision and contact dynamics modelling with both the lunar surface, and the lunar rover. Examples of these objects include small rocks, and scientific or other equipment placed in the scene by the rover. As yet another example, VA process 10 may be used for, e.g., a rover-based lunar mission to search for ice. Lighting, rover mass and locomotion, and sensor noise may be known through probability distributions. The terrain may be unknown and there may be a human driver giving periodic input. To discover what could go wrong in this scenario, VA process 10 may create a model of terrain variation and a model of the human driver. Monte Carlo simulations may be run, with the terrain parameterization being optimized for mission failure and the human driver model being optimized for mission success. When complete, terrain values that could cause failure despite the active intervention of the terrestrial driver may be found by VA process 10 similarly as discussed above using multi-optimization over Monte Carlo results. VA process 10 may be used to reduce, e.g., planning time, mission costs, and risk in at least two example ways: 1) during mission planning, the stochastic optimizing simulation tool of VA process 10 may identify the best mission designs and plans (e.g., mechanisms, navigation algorithms, tools, and sensor selections, etc.) given probabilistic descriptions of mission parameters and 2) during mission execution, the stochastic optimizing simulation tool of VA process 10 may provide real-time decision support to guide and inform remote supervisors similarly as discussed above. As such, the specific domains and components described above should be taken as example only and not to limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    configuring, by a computing device, a stochastic simulation scenario, wherein the stochastic simulation scenario is randomized and digital, includes hardware-in-the-loop architecture associated with the stochastic simulation scenario, and includes one or more variables without a complete probability distribution, wherein the one or more variables without a complete probability distribution includes human activity with an unknowable probability distribution;
    executing the stochastic simulation scenario to generate one or more results of the stochastic simulation scenario; and
    optimizing at least a portion of the one or more variables without the probability distribution using one or more optimization metrics on the one or more results of the stochastic simulation scenario.

2. The computer-implemented method of claim 1 wherein the stochastic simulation scenario includes at least one of:
    a land vehicle, an air vehicle, and a water vehicle;
    one or more fixed base articulated robot arms; and
    one or more mobile articulated robot arms mounted on at least one of the land vehicle, the air vehicle, and the water vehicle.

3. The computer-implemented method of claim 1 wherein the stochastic simulation scenario includes an autonomous convoy.

4. The computer-implemented method of claim 1 wherein the one or more optimization metrics includes a threshold measure of variance.

5. The computer-implemented method of claim 1 wherein the stochastic simulation scenario uses Monte Carlo analysis.

6. The computer-implemented method of claim 1 wherein the stochastic simulation scenario includes at least one of an orbit, an asteroid, a comet, a planet, and a moon.

7. The computer-implemented method of claim 1 wherein optimizing at least a portion of the one or more variables includes optimizing over multiple parameters to enable competing objective functions.

8. A non-transitory computer program product residing on a computer readable storage medium having a plurality of instructions stored thereon which, when executed across one or more processors, causes at least a portion of the one or more processors to perform operations comprising:
    configuring a stochastic simulation scenario, wherein the stochastic simulation scenario is randomized and digital, includes hardware-in-the-loop architecture associated with the stochastic simulation scenario, and includes one or more variables without a complete probability distribution, wherein the one or more variables without a complete probability distribution includes human activity with an unknowable probability distribution;
    executing the stochastic simulation scenario to generate one or more results of the stochastic simulation scenario; and
    optimizing at least a portion of the one or more variables without the probability distribution using one or more optimization metrics on the one or more results of the stochastic simulation scenario.

9. The computer program product of claim 8 wherein the stochastic simulation scenario includes at least one of:
    a land vehicle, an air vehicle, and a water vehicle;
    one or more fixed base articulated robot arms; and
    one or more mobile articulated robot arms mounted on at least one of the land vehicle, the air vehicle, and the water vehicle.

10. The computer program product of claim 8 wherein the stochastic simulation scenario includes an autonomous convoy.

11. The computer program product of claim 8 wherein the one or more optimization metrics includes a threshold measure of variance.

12. The computer program product of claim 8 wherein the stochastic simulation scenario uses Monte Carlo analysis.

13. The computer program product of claim 8 wherein the stochastic simulation scenario includes at least one of an orbit, an asteroid, a comet, a planet, and a moon.

14. The computer program product of claim 8 wherein optimizing at least a portion of the one or more variables includes optimizing over multiple parameters to enable competing objective functions.

15. A computing system including one or more processors and one or more memories configured to perform operations comprising:
    configuring a stochastic simulation scenario, wherein the stochastic simulation scenario is randomized and digital and includes one or more variables without a complete probability distribution, wherein the one or more variables without a complete probability distribution includes human activity with an unknowable probability distribution;

executing the stochastic simulation scenario to generate one or more results of the stochastic simulation scenario; and optimizing at least a portion of the one or more variables without the probability distribution using one or more optimization metrics on the one or more results of the stochastic simulation scenario, wherein optimizing includes an optimization algorithm held within an XML-specified class.

16. The computing system of claim 15 wherein the stochastic simulation scenario includes hardware-in-the-loop architecture associated with the stochastic simulation scenario.

17. The computing system of claim 15 wherein the stochastic simulation scenario includes at least one of:
a land vehicle, an air vehicle, and a water vehicle;
one or more fixed base articulated robot arms; and
one or more mobile articulated robot arms mounted on at least one of the land vehicle, the air vehicle, and the water vehicle.

18. The computing system of claim 15 wherein the stochastic simulation scenario includes an autonomous convoy.

19. The computing system of claim 15 wherein the one or more optimization metrics includes a threshold measure of variance.

20. The computing system of claim 15 wherein the stochastic simulation scenario uses Monte Carlo analysis.

21. The computing system of claim 15 wherein the stochastic simulation scenario includes at least one of an orbit, an asteroid, a comet, a planet, and a moon.

22. The computing system of claim 15 wherein optimizing at least a portion of the one or more variables includes optimizing over multiple parameters to enable competing objective functions.

* * * * *